(12) United States Patent
Cairns et al.

(10) Patent No.: US 7,599,098 B2
(45) Date of Patent: Oct. 6, 2009

(54) SYSTEM AND METHODS FOR COLOR MATCHING OVERPRINTED DOCUMENTS

(75) Inventors: Glen Cairns, Coquitlam (CA); Stan Kouchnarev, Port Moody (CA); Amit Av-Shalom, Vancouver (CA)

(73) Assignee: Kodak Graphic Communications Canada Company, Burnaby, British Columbia (CA)

( * ) Notice: Subject to any disclaimer, the term of this patent is extended or adjusted under 35 U.S.C. 154(b) by 891 days.

(21) Appl. No.: 11/122,090

(22) Filed: May 5, 2005

(65) Prior Publication Data
US 2005/0280847 A1  Dec. 22, 2005

Related U.S. Application Data

(60) Provisional application No. 60/567,814, filed on May 5, 2004.

(51) Int. Cl.
*G06K 15/00* (2006.01)
*G03F 3/08* (2006.01)

(52) U.S. Cl. ............... 358/3.21; 358/518; 358/534

(58) Field of Classification Search ............. 358/1.9, 358/3.06, 3.21, 518, 534; 345/539, 592, 345/639, 643
See application file for complete search history.

(56) References Cited

U.S. PATENT DOCUMENTS

| | | | |
|---|---|---|---|
| 5,438,653 A * | 8/1995 | Boenke et al. | 345/592 |
| 5,926,185 A | 7/1999 | Vyncke et al. | |
| 2001/0036311 A1 | 11/2001 | Tomomatsu | |
| 2002/0193956 A1 | 12/2002 | Van de Capelle et al. | |
| 2003/0160985 A1 * | 8/2003 | Bailey | 358/1.9 |
| 2004/0051884 A1 | 3/2004 | Saxton | |
| 2004/0085587 A1 * | 5/2004 | Broddin et al. | 358/3.06 |

FOREIGN PATENT DOCUMENTS

| | | |
|---|---|---|
| EP | 0 997 850 A2 | 5/2000 |
| EP | 1 104 918 A2 | 6/2001 |
| WO | WO 01/71656 A1 | 9/2001 |

OTHER PUBLICATIONS

International Search Report for PCT/CA2005/000697, International Searching Authority, Aug. 17, 2005, pp. 1-3.

* cited by examiner

*Primary Examiner*—James A Thompson
(74) *Attorney, Agent, or Firm*—Nelson Adrian Blish

(57) ABSTRACT

A system and methods for color matching overprinted graphic documents is described. Graphic elements in a document are examined to determine overlapping regions. The overlapping graphic elements in each region are examined to determine which graphic elements contribute color to the region. If two or more graphic elements contribute color, the region is an overprint region and information about the contributing graphic elements is used to create an overprint graphic element having contributed color. The original graphic elements and the overprint graphic elements are saved in a modified document, which is then processed to adjust the color of each graphic element to produce expected color on a target device that will display the modified document.

27 Claims, 15 Drawing Sheets

| | | Contributing Graphic Elements | | | | | | | |
|---|---|---|---|---|---|---|---|---|---|
| Identity | 201 | 202 | 203 | 204 | 205 | 206 | 207 | 208 | 209 |
| Painting Order | 1 | 2 | 3 | 4 | 5 | 6 | 7 | 8 | 9 |
| Type | Filled Path | Masked Image | Shading | Shading | Filled Path | Stroked and Filled Text | Blend | Stroked and Filled Text | Filled Text |
| Color Space | Separation | Device CMYK | Lab | Device3 | Separation | Device CMYK | Device3 | Device CMYK | Separation |
| Colorant Values | Magenta = 10 | Pixel-dependent | Varies Radially from centre of (10,10,0) to (10,10,100) | Cyan, Green, Red varies left to right from (10,20,0) to (10,20,100) | Orange= 20 | Fill: Cyan= 50; Stroke: Cyan= 50 | Magenta, Yellow, Black varies top to bottom from (10,20,30) to (80,20,30) in steps | Fill: Magenta= 50 Stroke: Black= 100 | Pink= 100 |

FIG. 3A

| Overprint Element Identity | Element Type To Represent | Color Space | Colorants | Contributing Element Identity | | | | | | | | | |
|---|---|---|---|---|---|---|---|---|---|---|---|---|---|
| | | | | 201 | 202 | 203 | 204 | 205 | 206 | 207 | 208 | 209 |
| 401 | Blend | Device4 | CMYK | | | | | | C=50 | MYK = (10-80, 20, 30) varying top to bottom | | |
| 402 | Stroked and Filled Text | Device3 | CMK | | | | | | C= 50 | | MK= (50, 100) | |
| 403 | Stroked and Filled Text | Device3 | MKP | | | | | | | | MK= (50, 100) | P=100 |
| 404 | Shading | Target Device6 | CMYKOG | | | CMYKOG varying radially | | | | | | CMYKOG recipe for Pink |
| 405 | Shading | Device4 | CMGR | M=10 | | | CGR= (10, 20, 0-100) varying left to right | | | | | |
| 406 | Image | Device6 | CMYKGR | | MYK pixel dependent | MYK varying radially | CGR= (10, 20, 0-100) varying left to right | | | | | |
| 407 | Image | Device6 | CMYKGR | | MYK pixel dependent | | CGR= (10, 20, 0-100) varying left to right | O=20 | | | | |
| 408 | Image | Device7 | CMYKOGR | | | | CGR= (10, 20, 0-100) varying left to right | O=20 | | | | |
| 409 | Shading | Device5 | CMOGR | M=10 | | | | | | | | |
| 410 | Image | Device4 | CMYK | M=10 pixel dependent | CMYK pixel dependent | | | | | | | |
| 411 | Filled Path | Device2 | MO | M=10 | | | | O=20 | | | | |
| 412 | Image | Device5 | CMYKO | | CMYK pixel dependent | | | O=20 | | | | |

FIG. 5

| Overprint Graphic Element Type | Graphic Element Type | | | | |
|---|---|---|---|---|---|
| | Image | Shading | Text | Path | Blend Of Fills |
| Image | Image | Image | Image | Image | Image |
| Shading | | Shading or Image | Shading | Shading | Collection Of Shadings |
| Text | | | Text | Text | Blend of Fills |
| Path | | | | Filled Path | Blend of Fills |
| Blend Of Fills | | | | | Blend Of Fills |

FIG. 7

SYSTEM AND METHODS FOR COLOR MATCHING OVERPRINTED DOCUMENTS

REFERENCE TO RELATED APPLICATION

This application claims the benefit of U.S. patent application No. 60/567,814 entitled "System and Methods For Color Matching Overprinted Documents" filed 5 May 2004 which is hereby incorporated by reference herein.

TECHNICAL FIELD

This invention pertains to color matching of graphic documents comprising graphic elements.

BACKGROUND

Graphic documents comprise graphic elements. The elements may describe text, artwork and image information for example. Graphic documents can be produced by any of a wide a variety of document creation applications. Color matching refers to transforming graphic element color so that, when a graphic element is displayed on a target device, the color produced by the target device is consistent with an expected color.

A graphic document may be produced by a variety of artists contributing different parts of the document. Each artist may define color using different color models (e.g. specific to a device or device independent). Thus, different graphic elements in a finished work may define color in different ways.

Graphic elements may be defined to overlap. This may result from the artist's intent (e.g. text printing over an image or artwork). When this occurs the artist determines the order in which the overlapping graphic elements paint. An artist may determine that a graphic element obscures part of another graphic element that paints earlier in a region where they overlap. This is accomplished by disabling the graphic element's overprint attributes.

Alternatively the artist can enable overprint, which allows a graphic element that paints earlier in an overlap region to show some of its color through the graphic element enabling overprint. If several graphic elements overlap in a region and all but the first one enable overprinting then each graphic element, including the one that painted first, may show some of their color in the overlap region. The overprint setting for the first graphic element does not matter since it is not on top of any other graphic elements.

Sometimes overprints occur independently of the artist's intent. Preparation of a document for printing can involve a variety of processes, including automated processes, that can alter a document. Trap processing is an example of a process that adds graphic elements to a document to improve its quality under certain printing conditions. A trap processor may intentionally introduce small overprint-enabled graphic elements along boundaries between adjacent or overlapping graphic elements.

The meaning of overprint attribute settings is defined by an imaging model supported by an image processor. Adobe® PostScript® and Portable Document Format (PDF) are examples of page definition languages (PDLs) supported by raster image processors. These PDLs define opaque and transparent imaging models that include color contribution rules that determine how colors from layered graphic elements will display. A raster image processor (RIP) interprets a PDL to paint graphic elements as pixels, taking painting order into account. At a pixel location where graphic elements overlap, the RIP uses color contribution rules to determine the color of the pixel, based on the color of each pixel corresponding to an overlapping graphic element.

A RIP produces raster for a specific device and thus transforms color defined for a different device or independent of a device to a model that is suitable for the specific device during the process of pixel creation. The transformation is based on information that correlates the different color models. Color matching is a similar process of transforming color with the intent that color displayed on a specific device will meet some expectation. An expected color can be based on, for example, a reference color chart, measured color values, or the color produced by a specific device.

It is convenient to perform color matching during or after the creation of pixels by an image processor since the image processor typically incorporates the overprint color contribution rules. However, the color matching process is computationally intensive and in some situations, any latency introduced while producing raster for the printing device is not desirable. Additionally, honoring the color information (e.g. color profile) associated with each graphic element may not be possible in some raster image processors.

One approach to addressing this latency is to perform color matching before delivering the document to the image processor. In one prior art example of this approach, the color matching engine ignored any overlapping graphic elements. The reason for this was that matching the color of overlapping graphic elements would result in the image processor creating an undesirable color in the overlap region. Although the non-overlapped colors would be correct, the minor adjustments in colors would cause the overprint color contribution rules to dictate a significantly different color than if the color matching had not occurred.

Another approach is to incorporate color contribution rules into a color matching engine so that only those overlapping graphic elements that would contribute color to an overlap region are ignored by the color matching engine.

Another approach that could be used to provide compatibility with image processors that do not support overprint color contribution rules, involves altering documents to eliminate overlaps. Overlaps can be eliminated by "flattening" the graphic elements. In overlap regions, the original graphic elements can be clipped out of the region and a new graphic element added to represent the overlap region. The color of the new graphic element can be based on a narrow gamut color model including only cyan, magenta, yellow and black colorants. Thus, processing a flattened document using historical color matching tools would result in expected color in all regions. One disadvantage of this approach is that it requires altering the graphic elements created by the artist or added by a print production process. It is convenient to edit at the graphic element level. This becomes much more difficult if the graphic elements have been altered. Another disadvantage of this approach is that the color model chosen for an added graphic element can result in some loss of color fidelity if the fidelity of the contributing graphic element color and the target device is higher than the color model chosen to represent added graphic elements.

Another approach involves altering a document to paint a new graphic element on top of each overlap region. Each new graphic element may be added with overprint disabled so that it is the only element that contributes color to the overlap region. The representation chosen for the new graphic element is raster. One disadvantage of this approach is that raster is not always the best representation for any combination of overlapped graphic elements. The accuracy of the new graphic element's color and geometry may be limited. For example, if the display device is not a raster device converting a vector graphic element into a raster graphic element results in some unnecessary quantization. Similarly, if the target raster display device has a resolution that is much higher than assumed when creating the new raster graphic element, the graphic element color and geometry may be too coarse. In addition, color fidelity for raster graphic elements can be limited to eight bits per color component in some embodiments. Another disadvantage is that creation of raster can be a computationally intensive process.

There is a need for a color matching solution that can produce a color matched document with correct handling of overlap regions that preserves the integrity of the original document. Ideally such a solution would allow convenient editing of the color matched document. It is also desirable to preserve the accuracy and fidelity of the original document without adding unnecessary complexity.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

This invention provides systems and methods for color matching overprinted graphic documents. Preferred embodiments are based on documents conformant with Adobe® Portable Document Format (PDF) or PostScript® specifications. A system, according to one embodiment of the invention, includes processing elements situated in a pre-press workflow system, the processing elements comprising:
1. An Overprint Engine, further comprising:
    a. A graphic element analysis engine that examines graphic elements in a document to determine overprint regions. Overprint regions are determined as regions where graphic elements overlap, where graphic elements painting later in the region are defined to overprint, and where more than one graphic element painting in the region contributes color to the region according to color contribution rules.
    b. An Overprint graphic element generator creates a modified document, by adding overprint graphic elements to paint on top of the corresponding overprint regions with color determined from contributing graphic elements according to color contribution rules. The type of graphic element chosen to represent an overprint region, as well as the color space and method for combining contributed color may be based on principles that aim to maintain geometrical accuracy, color accuracy, and color fidelity while reducing complexity.
2. A Color Matcher transforms the color of graphic elements in a modified document to produce a color-matched document suitable for a target device. Color is transformed to a color space, consistent with the target device, based on transforming information that adjusts color to meet expectations. Graphic elements, whose color is not already defined in the target color space, may be color-matched.

Alternative embodiments provide software plug-in modules that can be accessed from a graphic document software application where the functions of printing or viewing the graphic document requires color matching prior to generating image data for a printing or display device. Additional embodiments can be incorporated in a raster image processor. For example, the part of the raster image processor that interprets a document to produce a graphic element display list can modify the display list prior to rendering.

One advantage of color matching before rendering is that color matching can be a resource-intensive activity. Introducing latency, while converting a document to native device format (e.g. raster), is often undesirable. Additionally, providing a color-matched graphic document comprising overprint graphic elements allows the color-matched graphic document to be conveniently editable since the original graphic elements are preserved and the overprint graphic elements are identifiable.

In addition to the exemplary aspects and embodiments described above, further aspects and embodiments and features of example implementations of the invention will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

In drawings which illustrate non-limiting embodiments of the invention:

FIG. 3A is diagram illustrating selected information about overlapping graphic elements depicted in FIG. 2.

FIG. 5 is a diagram illustrating information about overprint graphic elements illustrated in FIG. 4.

FIG. 7 is a diagram illustrating exemplary representations for overprint graphic elements based on contributing graphic elements.

DESCRIPTION

Throughout the following description, specific details are set forth in order to provide a more thorough understanding of the invention. However, the invention can be practiced without these particulars. In other instances, well known elements have not been shown or described in detail to avoid unnecessarily obscuring the invention. Accordingly, the specification and drawings are to be regarded in an illustrative, rather than restrictive sense.

Figure 1:
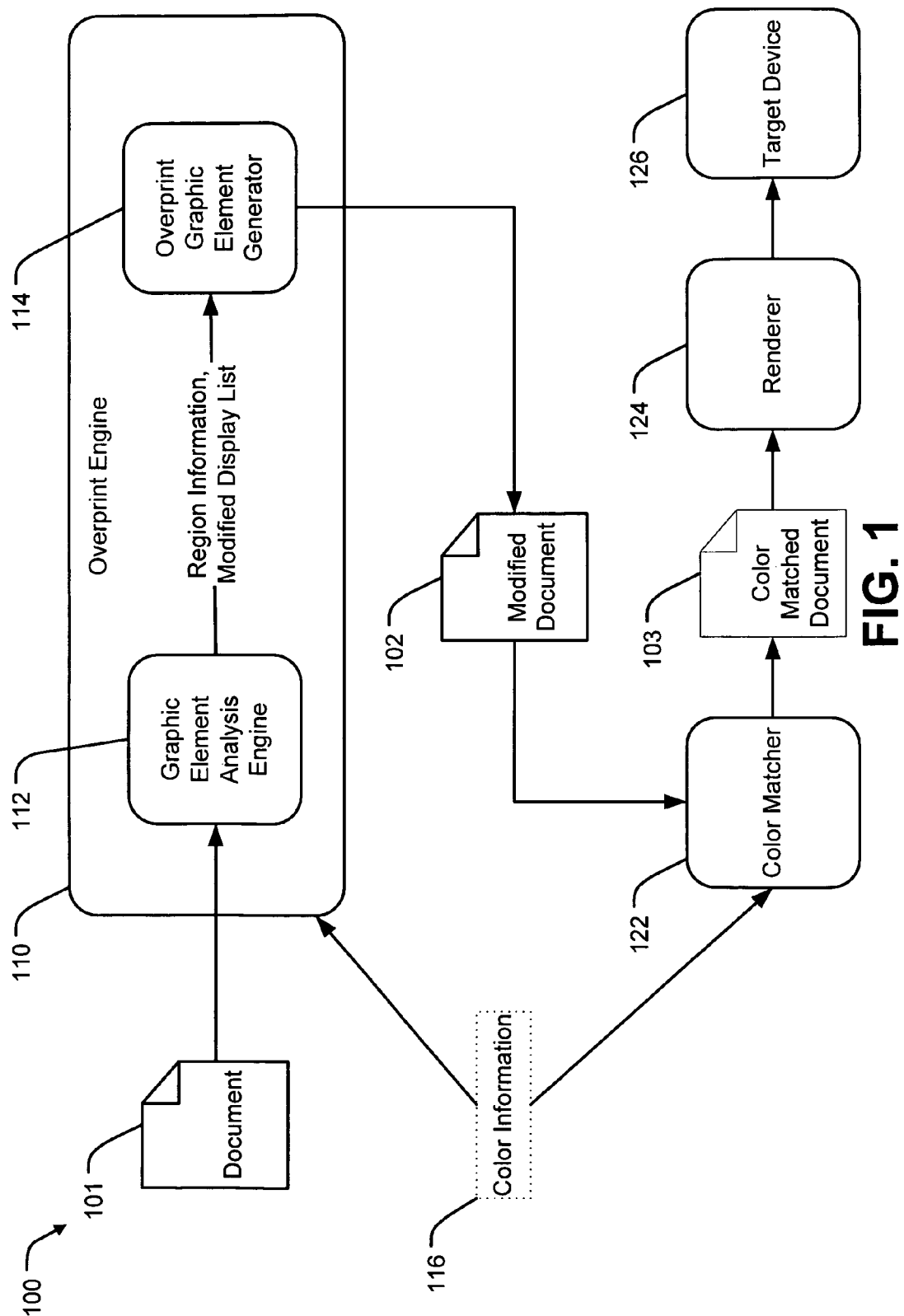
FIG. 1 is a block diagram illustrating the functional components of a color matching system.

FIG. 1 is a block diagram illustrating the components of a color matching system 100 according to one embodiment of the invention. System 100 operates on a document 101 before document 101 is rendered and printed on target device 126. Document 101 is a graphic document comprising vector graphic elements defined in a page description language (PDL). Exemplary PDLs include Adobe® PostScript® and Adobe® PDF. Target device 126 is a raster display device, such as an inkjet printer, a platesetter producing plates for a printing press, another type of color printer or a computer monitor. Target device 126 has color reproduction characteristics that can be measured and used as a basis for transforming the color of graphic elements defined in document 101. The goal of transforming color is to match the color intent of the artist who created document 101 or to match some other expectation.

Color reproduction characteristics can be obtained by a variety of means and utilized through a variety of transformation methods. For example, a test document comprising a set of carefully selected color patches is painted without color matching by target device 126. Test patch color is defined using a color space model with a set of color component values corresponding to the independent variables of the model. A variety of color space models can be defined. PDL specifications define supported color spaces. Color spaces can be classified in a variety of ways. One is by dependence on a device. Another is by gamut width. A wider gamut enables definition of a wider variety of colors than a narrower gamut.

As an example of a device-dependent color space, a computer display may use a DeviceRGB color space model with color components corresponding to the additive primary color (Red, Green and Blue) light-emitting elements of the display. Color component values vary over some range defined by the color space model. Typically the values range from zero to one hundred percent with zero typically representing no contribution and one hundred percent typically representing maximum contribution.

A DeviceCMYK color space model can be used for marking devices that mark with cyan, magenta, yellow and black colorants. These colorants are subtractive primary color components that reproduce color by absorbing certain incident light wavelengths. A DeviceN color space model can be used for marking devices that mark with a number (N) of different color components. The gamut of colors produced by CMYK marking devices is typically not as wide as those produced by RGB computer display devices. By adding additional primary marking color components, such as orange and green, a marking device gamut can be widened to be closer to the range of colors available to a computer display device. DeviceN color space models are useful for representing these wider device-dependent gamuts.

Other color space models are intended to be independent of devices. The CIE (Commission Internationale d'Eclairage) defines a color space in terms of three color component values, two determining chromaticity and one determining luminosity. The Lab color space is an example of a CIE-based color space. Device-independent color space models typically have wide gamuts.

A device's color output can be measured using a spectrophotometer or other optical measurement device. Each color measurement comprises a set of attributes, each with a range of possible values. The measured values are compared to the expected result for a color-matched device. Based on the differences, information is created that can be used to transform the color component values defined for a graphic element. When the transformed color is painted on a target device 126, the measured result is consistent with an expected result. Transformation information can be used to map color component values between a (wide gamut) device-independent color space and the device's (narrower gamut) native color space. Typically, both the artist's computer display and the target device are measured to reduce device-dependent errors introduced during color specification or reproduction. Transformation information can take a variety of forms. One example of transformation information is an ICC profile specified by the International Color Consortium®. An ICC profile provides information that enables colorant values to be transformed between the color space and a device-independent connection space. It is understood that the term profile, used for simplicity hereafter, is interchangeable with any color transformation information used by a supporting method.

Often, the artist is unaware of the target device but specifies color settings in a document creation application that can include a definition of display and/or marking devices. These source devices define color spaces and color gamuts available to the artist during document creation. Graphic elements created in the context of a source device include color component values defined by the corresponding color space. Information about a source device's color space or profile may not be available in document 101 and may have to be conveyed independently of document 101. If the information is unavailable to a processing element, assumptions about the information may have to be made.

As illustrated in FIG. 1, document 101 has a PDL format and other workflow system processing elements may have processed it already. For example, document 101 may have been created as a PostScript® format document with a workflow system converting it to a PDF format document (or a set of PDF page-wise documents), modifying graphic elements (e.g. text corrections, font substitution, and image compression), and adding graphic elements (e.g. trap elements to improve the printed quality of adjacent or overlapping graphic elements).

Alternatively, document 101 can have a display list format that is generated by interpreting the PDL. A display list format comprises a painting-order list of graphic elements, with each graphic element associated with a set of graphic attributes (e.g. element type, geometry, color space, color component values) defined by the PDL. FIG. 1 depicts other documents produced by System 100. These documents can also be in PDL or display list format depending on the embodiment. The foregoing description illustrates an example of a workflow system embodiment. Other embodiments are also possible. As an example, the invention can be applied in the printing function of a document creation application that is generating output directly to a printing device. Alternatively, the invention can be applied in a preview function that is generating output for a computer display.

Throughout the remainder of the description, the following embodiment will be used to simplify the description, unless stated otherwise. Document 101 is a single page graphic document in PDL format. The intent is to process document 101 through a computerized printing workflow system to produce plates for a printing press having a wider device color gamut, achieved with six process (e.g. Hexachrome™) colorants and one or more spot colorants. It is understood that the term colorant, referring to subtractive color components of a target device color space model and used hereafter for simplicity, is interchangeable with the more general term color component that applies in all color space models. Similarly, the term process colorant, referring to a subtractive primary colorant and used hereafter for simplicity, is interchangeable with the more general terms primary color component or device-independent color component.

Overprint engine 110 obtains document 101 and color information 116 as inputs to produce modified document 102 as an output. Modified document 102 is a document comprising the graphic elements of overprinted graphic document 101 with new overprint graphic elements added to represent the combined colors of contributing graphic elements, defined to overprint, in regions where they overlap. Each overprint graphic element is defined to display after all of the graphic elements that contributed color to the overlap region. Each overprint graphic element is defined to display in a manner that obscures the portion of contributing graphic elements in the overlap region.

Overprint engine 110 comprises two components in this embodiment. Graphic element analysis engine 112 examines graphic elements in document 101, in conjunction with color information 116, to identify overprint regions, defined as overlap regions where more than one overlapping graphic element contributes color. Overprint engine 110 generates information about each overprint region and modifies document 101 to enable association of graphic elements with the overprint region information. Overprint graphic element generator 114 generates new overprint graphic elements corresponding to each overprint region based on information from graphic element analysis engine 112 and color information 116. This embodiment prescribes a two-step method. Other embodiments can prescribe a single-step method, where an overprint graphic element is generated as each overprint region is identified.

Color matcher 122 obtains modified document 102 and color information 116 as inputs to produce color-matched document 103 as output. Color-matched document 103 comprises all of the graphic elements of modified document 102 with color space and colorant values of all graphic elements modified to conform with the profile of target device 126. The color space corresponds to the colorants painted by target device 126. In a marking device embodiment, colorants comprise process and optionally spot colorants. Spot colorants correspond to unique colors that are either difficult to simulate with process colorants or have other unique characteristics. For example, in marketing campaigns, specific colors often must have a consistent appearance in a wide variety of display contexts. Spot colorants can provide this consistency.

Renderer 124 obtains color-matched document 103 as input and produces image raster data for target device 126. The image raster data comprises separate raster data for each of a number of colorant channels. Each colorant channel corresponds to one of the process or spot colorants painted by target device 126. It is understood that target device 126 can be other than a raster imaging device. Target device 126 could utilize a different form of image data and could require a processing element instead of renderer 124 to convert a document from PDL to native device format.

Certain implementations of the invention comprise computer processors, which execute software instructions, which cause the processors to perform a method of the invention. For example, overprint engine 110 and color matcher 122 can be implemented by providing software, which runs on or more computer systems and causes the computer systems to operate to perform the methods described above. The program product may comprise any medium which carries a set of computer-readable signals comprising instructions which, when executed by a computer processor, cause the computer processor to execute a method of the invention. The program product may be in any of a wide variety of forms. The program product may comprise, for example, physical media such as magnetic storage media including floppy diskettes, hard disk drives, optical data storage media including CD ROMs, DVDs, electronic data storage media including ROMs, flash RAM, or the like or transmission-type media such as digital or analog communication links. The instructions may optionally be compressed and/or encrypted on the medium.

Overprint Example

Figure 2:
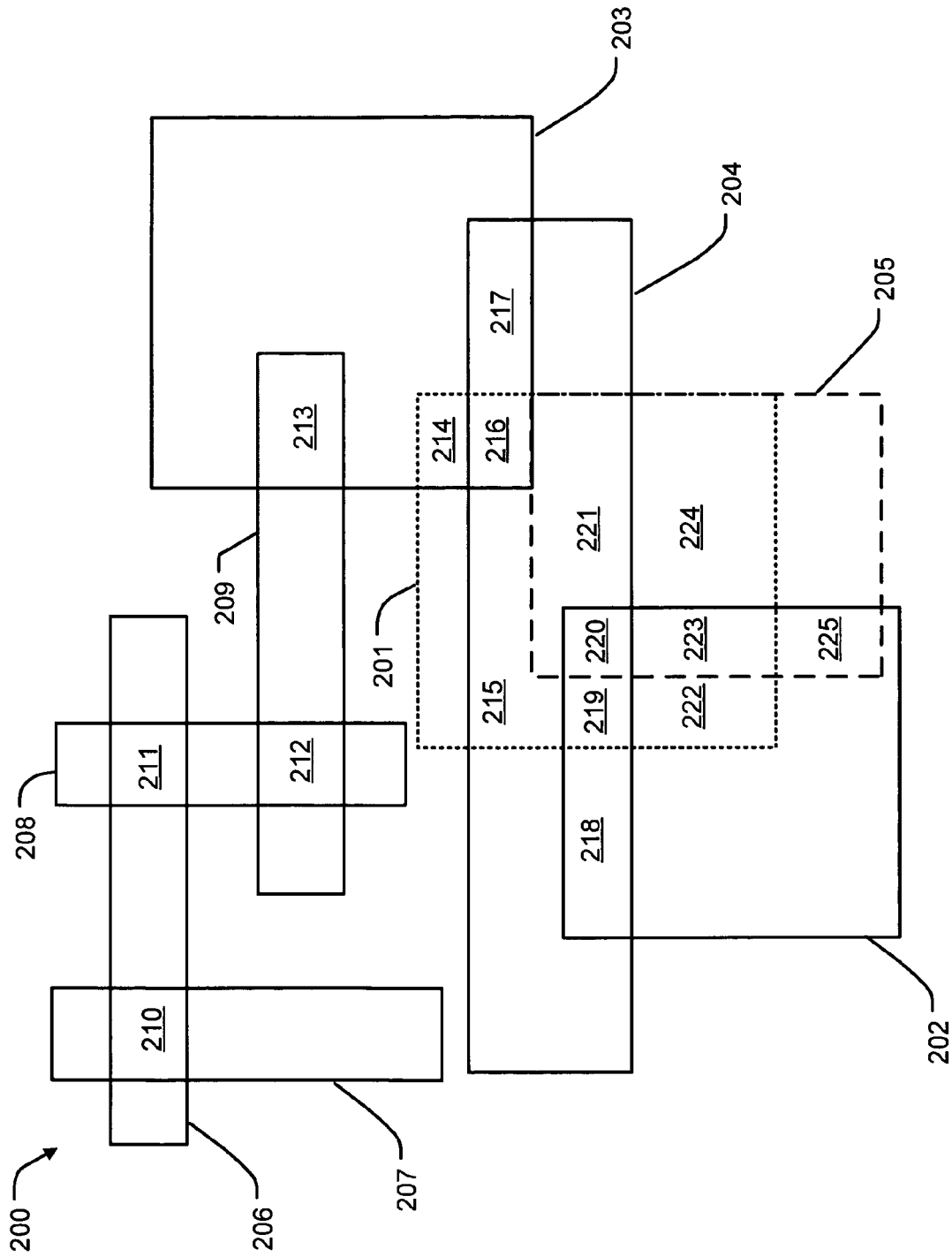
FIG. 2 is a diagram illustrating an exemplary overprinted graphic document prior to being processed for overprints and color matching.

FIG. 2 is a diagram illustrating a portion of exemplary document 101 prior to being processed for overprints and color matching. Document 101 includes graphic elements 201-209 and overlap regions 210-225. Note that not all distinct overlap regions are uniquely identified. Combinations of regions 210-225 form overlap regions. For example, regions 215, 216, and 219-221 together form a distinct overlap region based on graphic element 204 overlapping graphic element 201. Graphic element reference numbers signify relative painting-order (e.g. graphic element 201 paints first and graphic element 209 paints last).

Selected information about graphic elements 201-209 is provided in FIG. 3A. Each graphic element is assigned a unique identifier, as depicted by identity 302. Each graphic element's relative painting-order 304, type 306, color space 308 and colorant values 310 are also indicated.

As an example, graphic element 201 is a filled path type. A filled path type graphic element comprises a constant fill color bounded by a closed path comprising one or more path sections. In this example, graphic element 201 is bounded by a single closed rectangular path section with a fill color defined by a Separation (single colorant) color space defining a magenta colorant with colorant value of 10%. More generally, paths can have both fill and stroke attributes defined. Different stroke and fill colors can be defined. A stroke also has a width so that one half of the stroke is painted on either side of the path in the stroke color.

Graphic element 202 is a masked image type. Masked images are images (two-dimensional arrays of pixels) that also comprise a mask. The mask comprises pixels, corresponding with the image pixels. Each mask pixel determines whether painting of the corresponding image pixel is enabled. Each image pixel of masked image 202 is defined in a Device-CMYK color space with the colorant values for each pixel varying according to the image that it represents. In some embodiments, pixel colorant values are restricted to eight bits per colorant per pixel. This provides lower color accuracy than is available with other graphic element types.

An alternative form of the mask data for an image mask graphic element is to provide a mask expression indicating a range of colorant values for which image pixels are enabled (or disabled). When color matching overprinted graphic elements it can be advantageous to convert the mask from an expression format to a positional (pixel) format. For example, uncorrected image pixels that are enabled (or disabled) by the mask expression may become disabled (or enabled) after color correction resulting in an unanticipated masking operation.

Graphic element 203 is a shading type. A graphic element of the shading type has colorant values that vary over a defined range according to a function based on geometry information. Linear and radial geometries are examples. Shading 203 has a color defined in the Lab color space with a chromaticity value varying from zero to one hundred percent along a radius originating from the center of the graphic element.

Graphic element 206 is a stroked and filled text type. A text type is similar to a path type in that it defines a path corresponding to the fill area of text characters. Text types provide additional geometry information that allows a more precise path to be generated over a range of device resolutions. Text 206 is both stroked and filled but the colorant values for both stroke and fill are the same. This yields painted text characters of a uniform color whose dimension is determined by the union of the text fill and stroke areas.

Graphic element 207 is a collection of filled path graphic elements whose purpose is to simulate a shading graphic element. Such elements can be created, for example, when document creation tools do not support creation of the shading type but it is desired to emulate the shading type. The filled path graphic elements are arranged adjacent to one another with their colors varying by small amounts between each adjacent graphic element. Graphic element analysis engine 112 recognizes this collection of related graphic elements as a pseudo graphic element type called a blend. The outline of blend graphic element 207, depicted in FIG. 2, is the outline of the area corresponding to the union of the constituent path fill areas (arranged vertically and having a common width that is the width of blend 207).

Figure 3B:
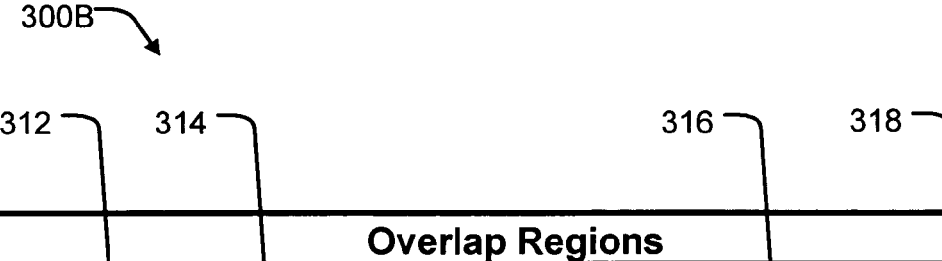
FIG. 3B is a diagram illustrating selected information about overlap regions formed by contributing graphic elements depicted in FIG. 2.

Selected information about overlap regions 210-225 is depicted in FIG. 3B. Regions are identified by reference 312. An overlap region identified as the addition ("+") of two or more references defines a region that is the union of the referenced regions.

Element stack 314 identifies the inverse painting-ordered (e.g. topmost first) set of graphic element identifiers that overlap to define the overlap region. Not all overlap regions are overprint regions or unique overprint regions because of the color contributions of the graphic elements in element stack 314. Whether a graphic element contributes color to a region is determined by a set of color contribution rules as described below.

Comment 316 provides additional information about overlap regions of interest. For example, region 214 is not an overprint region because graphic element 201 does not contribute any color to the region and only graphic elements 201 and 203 define the region. Similarly, region 222 is not an overprint region because graphic element 201 does not contribute any color to the region and only graphic elements 201 and 202 define the region. See below for a description of methods, according to the invention, for determining how graphic elements with colors defined in different color spaces contribute color to overlap regions.

The comments for region 216 and 217 indicate that neither overprint region is unique. As above, graphic element 201 does not contribute color in regions where it is overlapped by graphic element 203. However, graphic element 204 also overlaps graphic element 203 in overlap region 216. Since graphic element 203 contributes color, where it is overlapped by graphic element 204, region 216 is part of an overprint region. The comment for region 217 indicates that color contribution from its constituent graphic elements (203 and 204) is equivalent to region 216. Therefore, a new overprint region (216+217) is defined as a combination of regions 216 and 217, corresponding to overprinting graphic elements 203 and 204.

Overprint element identity 318 indicates exemplary overlap regions that are overprint regions. Entries specify the identity of overprint graphic elements that will be generated by overprint graphic element generator 114. Note that not all potential overprint regions have been depicted in FIG. 3B for simplicity. For example, the region defined by the overlap of graphic elements 204 and 201 is an overprint region that covers the overlap areas 215, 216, and 219-221.

Figure 4:
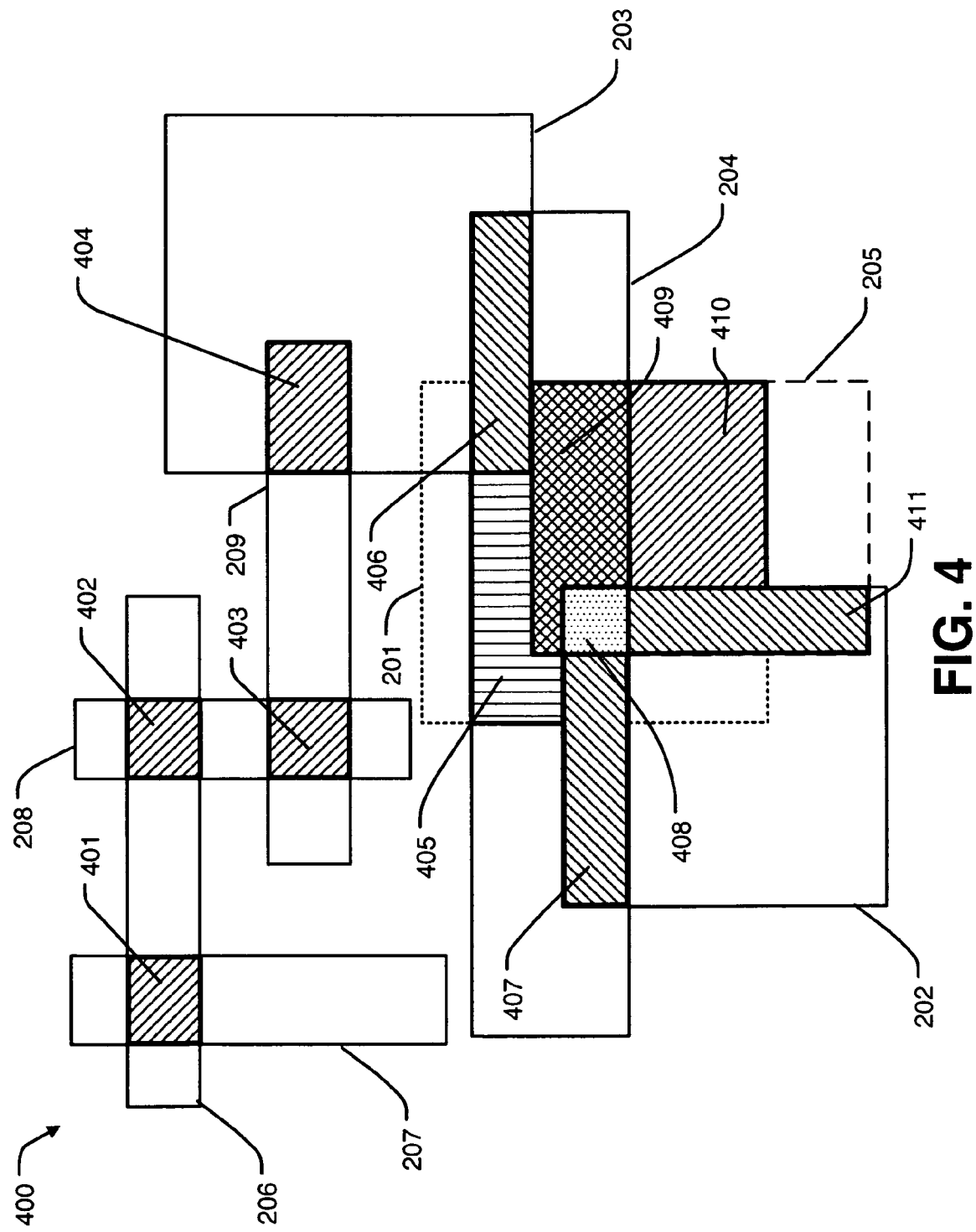
FIG. 4 is a diagram illustrating an exemplary modified document, corresponding to the document of FIG. 2 with overprint processing applied.

FIG. 4 is a diagram illustrating a portion of modified document 102, corresponding to processing of document 101 by overprint engine 110. The illustrated portion of modified document 102 corresponds to the portion of document 101 illustrated in FIG. 2. Patterns in the diagram indicate where new overprint graphic elements 401-412 will paint in combined color to knockout colors painted by contributing graphic elements. If document 101 was not color-matched, the visual appearance of it and modified document 102 would be substantially the same.

However, when color matching occurs, the colors of the contributing graphic elements in document 101 are transformed so that some colorant values of graphic elements, defined to overprint, are adjusted from zero to some non-zero value. Color contribution rules, such as those associated with an opaque imaging model, would change the manner in which transformed graphic elements contribute color in overlap regions and could cause an undesirable result. By creating overprint graphic elements with color combined prior to color matching, such as those defined in modified document 102, the color-matched document produces color that more closely resembles the intended color of document 101 in overprint regions as well as non-overprint regions.

FIG. 5 is a diagram illustrating example information about overprint graphic elements depicted in FIG. 4. Rows in FIG. 5 are provided for each overprint element identity 502. Columns are provided for each contributing (graphic) element identity 512. The intersection of each row and column contains information about the colorant values contributed by the contributing graphic element (column) to the corresponding overprint graphic element (row). For each overprint graphic element, additional information is provided. Element type to represent 504 identifies the type of graphic element chosen to represent the overprint region best, based on the contributing graphic element types. Color space 508 identifies the color space model chosen to represent the color of the overprint graphic element. Colorants 510 identify the colorants painted by the overprint graphic element. Details of methods for choosing graphic element representation and color contribution are discussed below.

Example Method

Figure 6A:
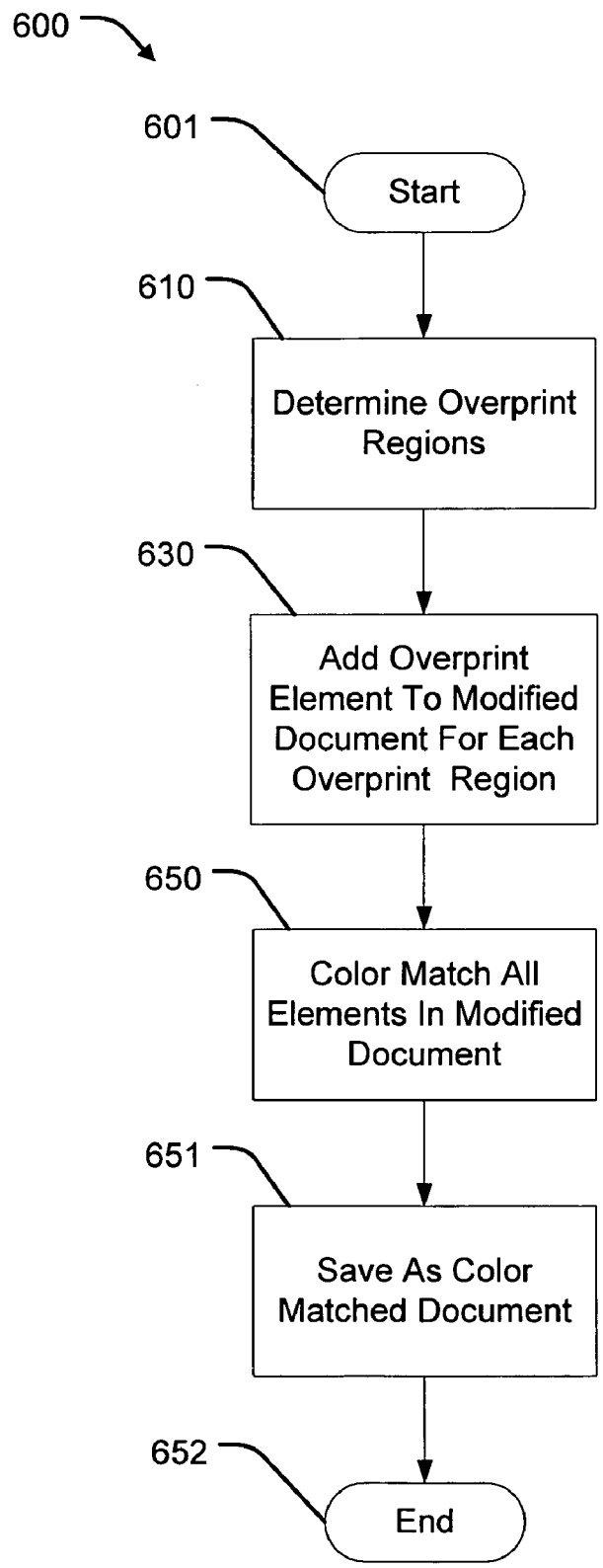
FIG. 6A is a flow chart diagram illustrating an exemplary method for color matching overprinted graphic documents.

FIG. 6A is a flow chart diagram illustrating an exemplary method for color matching overprinted graphic documents corresponding with the processing elements illustrated in FIG. 1. The method starts at block 601 by obtaining document 101. Next, graphic element analysis engine 112 identifies overprint regions. Next, at block 630, overprint graphic element generator 114 creates a new overprint graphic element for each overprint region identified. Overprint graphic element generator 114 saves these new graphic elements in modified document 102.

Next, at block 650, color matcher 122 uses color information 116, which may be supplied, for example, from a workflow system or modified document 102 or other entity, to transform color for target device 126. Color information 116 can comprise, for example, one or more of:

Target color space—identifying a color space such as DeviceCMYK or DeviceN and a set of colorants that comprise that color space. Process colorants are identified. The remaining colorants defined by the target color space are spot colorants available to be painted by the target device.

Spot colorant recipes—identifying the combinations of process colorants to be used when simulating specific spot colorants that are not painted by the target device.

Target color profile—identifying how to modify color values defined in a device-independent connection space to achieve a matching color on a target device.

Source color spaces—identifying one or more color spaces and the set of colorants that comprise each color space.

Source color profiles—each identifying how to modify color values defined in a source color space, corresponding to a source device, to achieve a matching color in a device-independent connection space.

Color matcher 122 interprets the PDL of modified document 102 if it is in that format and adjusts the color space and colorant values for each graphic element in modified document 102 based on color information 116. Color matching, according to one embodiment, occurs as described below. Other color matching methods are also possible. Colors defined in a source color space are first transformed into a device independent connection space, using a source color profile. Then they are transformed into a target color space using a target color profile. Colors in a device independent connection space need only be transformed into the target color space. Colors already in the target color space do not need to be transformed. Spot colorants are transformed to source color space with colorant values based on spot colorant recipes, then transformed into device independent space based on the source color profile. Then the simulated spot colorant values are transformed into target color space based on the target color profile.

Next, at block 651, color matcher 122 saves the changes as color-matched document 103. Color-matched document 103 can have a suitable format such as PDL or display list. The method then ends at block 652

Overprint Region Analysis

Figure 6B:
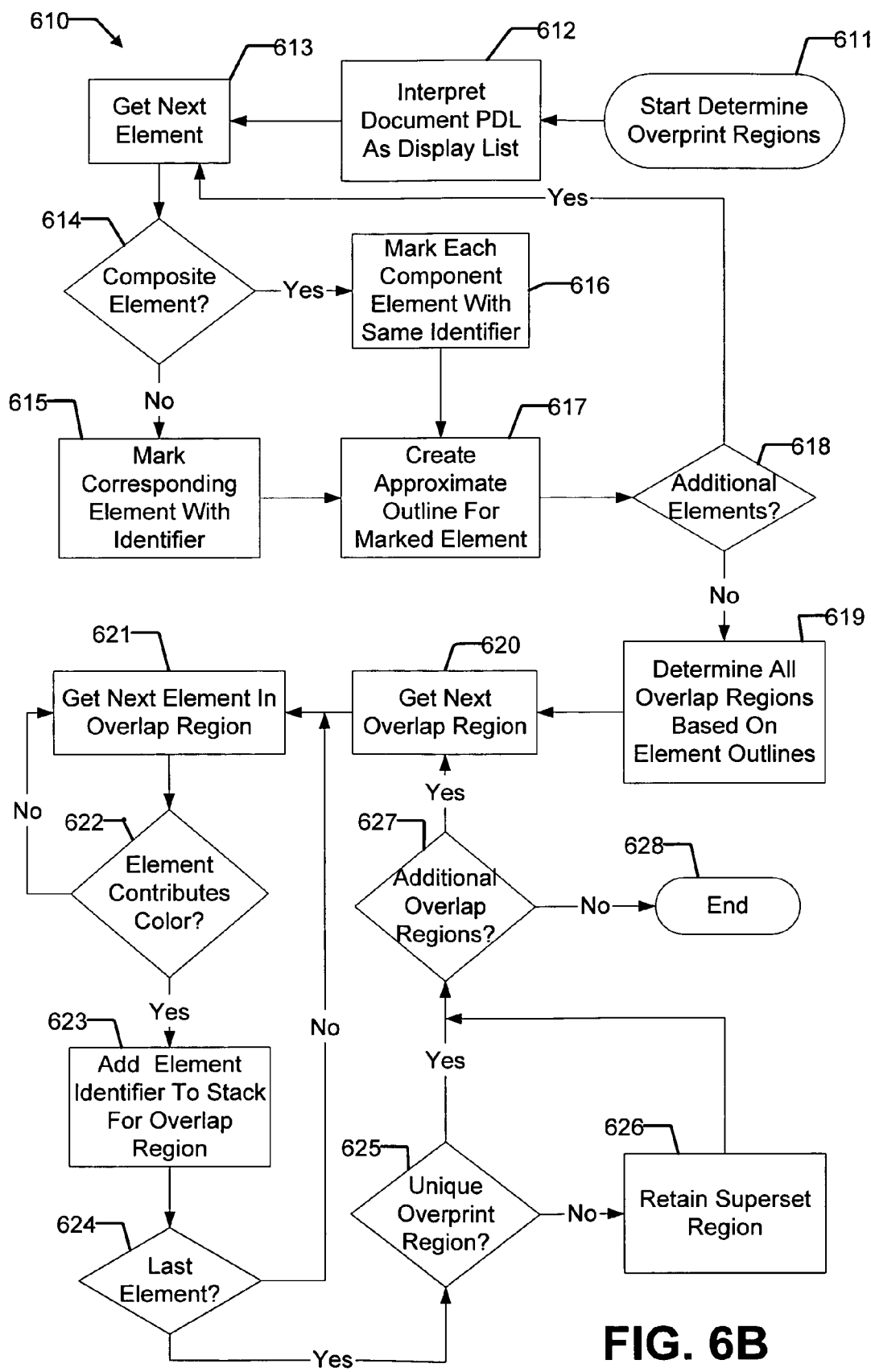
FIG. 6B is a flow chart diagram illustrating an exemplary method for determining overprint regions.

FIG. 6B is a flow chart diagram illustrating an exemplary method for identifying overprint regions. The method starts at block 611 and proceeds to block 612 where, if necessary, the PDL of document 101 is interpreted to a display list format. Next, block 613 obtains the first element in the display list and at block 614 determines whether this is a single element or is a component of a composite graphic element, such as a blend.

In one embodiment, a composite element is identified by using a pipelined graphic element processor architecture. An earlier processor can identify composite graphic elements made up of a series of single elements and emit the composite graphic element to subsequent processors instead of the single elements. Single elements that are not identified as being part of a composite element are otherwise emitted by the processor. Similarly, single graphic elements can be separated into more than one graphic element that produce the same visual appearance. Overprint region determining logic can exist within a subsequent process that takes advantage of these complexity reduction processes. Thus, graphic element analysis engine 112 can include a series of pipelined processes.

If the graphic element is a single element, the method proceeds to block 615 where a unique element identifier is created and associated with the corresponding graphic element. In one embodiment, where graphic element analysis engine 112 provides overprint graphic element generator 114 with a modified display list, this information is associated as additional properties of the graphic element in the display list of document 101. In other embodiments, where graphic element analysis engine 112 provides overprint graphic element generator 114 with a modified PDL, the information can be associated using marked content capabilities of the PDL.

If the graphic element is a component of a composite element, the method proceeds to block 616 where the same element identifier, previously associated with the composite element, is associated with the component element.

After block 615 or block 616, the method proceeds to block 617 where an approximate outline is created for the single element or the composite element (either after the last component is identified or in an incremental fashion). The approximate outline is associated with the corresponding graphic element identifier and is used later to determine overlap regions. The approximate outline can be generated as follows:

Path Graphic Element—If the path is only filled, the outline identifies the interior of the area traversed by the path (e.g. the fill area). If the path is only stroked, the outline identifies the stroked area traversed by the path. If the path is both stroked and filled with the same colorant values, the outline defines the union of above-mentioned areas. If the path is both stroked and filled but with different colorant values, graphic element analysis engine 112 converts the elements into, visually equivalent, distinct graphic elements representing the stroked and filled parts of the path graphic element.

Text Graphic Element—The outline is generated in a manner that is similar to that used for a path graphic element. However, to reduce computational overhead, the outline of the text path may be generated as an approximation, based on the text graphic element's properties. The approximation is adequate for determining overlap regions.

Shading Graphic Element—The outline is generated in a manner that is similar to that used for a filled path graphic element.

Image Graphic Element—The outline is generated, based on the geometry defined for the graphic element, identifying the area covered by all of the pixels.

Image Mask Graphic Element—The outline is generated based on the image geometry and mask data defined for the graphic element and identifies the area covered by painting-enabling portions of the mask.

Masked Image Graphic Element—The outline is generated in a manner that is similar to that used for an Image Mask graphic element.

Composite Graphic Element—The outline is generated as a union of the outlines of the component graphic elements.

After creating the outline, the method proceeds to block 618 where a test for additional graphic elements is performed. If there are additional graphic elements in the display list, the method proceeds to block 613 to examine the next graphic element. Otherwise, if there are no additional graphic elements, the method proceeds to block 619.

Block 619 identifies all overlap regions by comparing graphic element outline geometries. Methods for determining whether two or more outlines overlap are well known in the art. Conceptually, all combinations of two or more graphic elements are tested, though methods to reduce the number of combinations to be tested exist. For each overlap region identified, the collection of graphic elements that form the region is associated with the region in inverse painting-order (e.g. the element painted last on top).

Next, at block 620, the process of testing each overlap region for color contribution begins, starting with a first overlap region. At block 621, the topmost graphic element associated with the region is examined first.

Next, at block 622 the method determines whether the graphic element contributes any color to the overlap region. A set of color contribution rules, such as those described below, is used as the test. If the graphic element does not contribute color, the method proceeds to block 621 to obtain the next graphic element associated with the overlap region. Otherwise, the method proceeds to block 623.

Complexity of the color matched document can be reduced by various means. As an example, a graphic element that only paints in an overlap region but does not contribute color (e.g. an element that is completely occluded by other elements) can be removed from the document in order to reduce complexity, though information about the original document would be lost as a consequence. As another example, a graphic element that only defines color that is natively printed by the target device (e.g. by a spot colorant) can be ignored at this step to reduce the complexity of the overprint graphic element or prevent its creation (e.g. only two overlapping elements).

At block 623 the graphic element identifier is added to the top of a stack, associated with the overlap region. Next, at block 624, the method determines whether any additional graphic elements are associated with the overlap region. If there are additional graphic elements, the method proceeds to block 621 where the next graphic element is examined. If there are no additional graphic elements corresponding to the overlap region, the method proceeds to block 625.

Proceeding at block 625, the method tests whether the stack of graphic elements for the overlap region is an overprint region and if so whether it is a unique overprint region. If the stack contains only one graphic element contributing color, it is not an overprint region. If the stack contains more than one element that contributes color, it is tested against previously generated overprint region(s) to determine if their graphic element stacks match. If no match is found, the overlap region is declared an overprint region and the method proceeds to block 627. Otherwise, the method proceeds to block 626 where the region whose geometry is a superset of the other is retained.

Proceeding at block 627, the method determines whether additional overlap regions remain to be examined. If so, the method proceeds to block 620 to examine the next overlap region. Otherwise, the method proceeds to block 628 and ends.

Overprint Graphic Element Generation

Figure 6C:
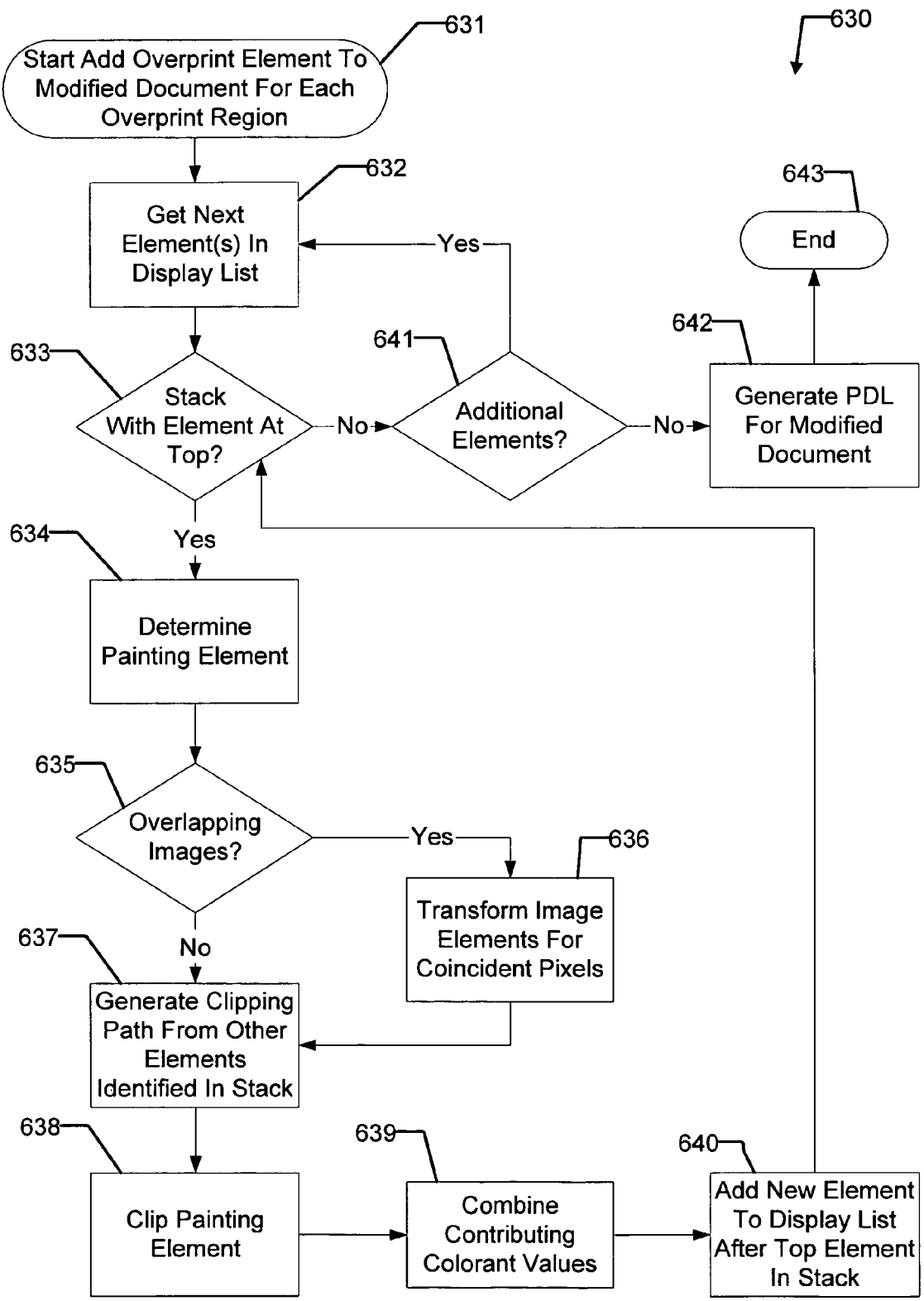
FIG. 6C is a flow chart diagram illustrating an exemplary method for creating a modified document containing overprint graphic elements corresponding to overprint regions.

FIG. 6C is a flow chart diagram illustrating an exemplary method for creating a modified document containing overprint graphic elements corresponding to overprint regions. The method begins at block 631. It proceeds to block 632 where the first graphic element in the modified display list is examined. The graphic element can be either a single or a composite graphic element.

The method proceeds to block 633 where it determines whether the current graphic element identifier corresponds to an overprint region having that identifier as the top element in its stack. If it is not the top element in any stack, the graphic element information is cached and the method proceeds to block 632 to examine the next graphic element in the modified display list. If the current graphic element is the top element in the stack, then all elements in the stack have been cached and the method proceeds to block 634.

If multiple stacks exist where the current graphic element is at the top of the stack, the method processes the stacks in order. In one embodiment, the order is based on comparing the stacks. For example, stacks are successively compared in pairs to determine relative ordering. For two stacks being compared, their elements are examined element-wise, in painting order. When the first differing elements are found, the stack having the later-painting element is ordered after the other stack. Additionally, if one stack has the same elements as the other stack but has additional elements as well, the longer stack is ordered after the shorter stack.

Proceeding at block 634, the method determines a graphic element type to be used to represent the overprint region. The type can be chosen to correspond with one of the graphic elements identified in the stack or it can be chosen to be of a different type. The details of choosing the best representation are described below. Assuming that one of the graphic elements in the stack is chosen to represent the overprint region, the method proceeds using that graphic element as the basis for painting the overprint region.

Next at block 635, the method determines whether the stack of graphic elements associated with the overprint region includes more than one Image or Masked Image. If not, the method proceeds to block 637. Otherwise, the method proceeds to block 636 where the graphic elements are modified, if necessary, so that their pixels are coincident. This may require establishing a new coordinate system for one or more of the pixel arrangements and/or a modification of the number of pixels for each image. The outlines of the images may also need to be regenerated.

Proceeding at block 637, the method generates a clipping path based on the remaining elements identified in the stack. The approximate outline generated by graphic element analysis engine 112 is used to generate a clipping path. The clipping paths for each graphic element are combined to form a new clipping path that defines the geometry of their intersection.

At block 638, the new clipping path is used to clip the painting graphic element representation determined at block 634. This results in an overprint graphic element that is defined so that it paints only in the overprint region. Next, at block 639, the contributing colorant values from each element in the stack are combined. The colorant values may be combined as described below, for example. If none of the contributing graphic elements is chosen to represent the overprint region, the outlines from all contributing graphic elements are used to form a clipping path to be used on a representative graphic element whose area covers at least the area enclosed by the clipping path.

At block 640, the method adds the new overprint graphic element to the modified display list so that it paints after the topmost graphic element in the associated stack. Next, at block 633, the method determines whether any other overprint region has the current element at the top of its stack. If yes, the method proceeds to block 634. Otherwise, the method proceeds to block 641.

At block 641, the method determines whether additional elements are available in the display list to be examined. If yes, the method proceeds to block 632. Otherwise, the method proceeds to block 642 where the modified display list is converted to PDL format and saved as modified document 102.

Overprint Graphic Element Color

Color contribution rules can be established to determine whether or not a graphic element contributes color to an overprint region, and the method for combining color from contributing graphic elements. The goal of a set of color contribution rules may be to provide a combined color that closely resembles the artist's intent with a reasonable level of complexity.

A combining method may require that graphic elements define a particular color space or that graphic elements define a common color space or at least define a congruous set of colorants. For example, a colorant from a device-dependent and a device-independent color space are incongruous, as are an additive colorant and a subtractive colorant. However, a colorant defined in a source DeviceCMYK color space is congruous with a colorant defined in a subtractive DeviceN or Separation color space.

One rule set, defined by PDL specifications, is based on color defined by congruous subtractive color spaces and painted using an opaque imaging model. As an example, one rule dictates that a graphic element set to paint without an overprint setting enabled will cause any graphic element that painted before it to be obscured in areas where they overlap.

Other rules in the set, paraphrased here, dictate that a graphic element, painting earlier in an overlap region, contributes color in the overlap region for any colorant that is not painted by graphic elements, defined to overprint and painted later in the overlap region. For example, a first graphic element painting cyan and magenta is overlapped by a second graphic element painting magenta and yellow. The overlap region's color contribution includes the cyan colorant values from the first graphic element and the magenta and yellow colorant values from the second graphic element. In other words, the colorant values from a graphic element painted later take precedence. Additional rules can dictate that graphic elements, that are not of the image type, and define a zero value for a colorant do not prevent an earlier painting graphic element from contributing that colorant to the overprint region. Conversely, an image, defining CMYK colorants, will prevent any earlier painting graphic elements from contributing those colorants in the overprint region.

Other overprint color contribution rule sets are possible including one that pertains to a transparent imaging model. In a transparent imaging model, earlier painted graphic element color contributions in an overlap region can be a function of the degree of transparency of graphic elements painted later. The graphic elements may have a transparency attribute that specifies their transparencies.

For cases where contributing graphic elements define congruous source color spaces, a DeviceN color space can be conveniently used to represent colorants contributed from graphic elements. The value of N is determined by the number of colorants painted collectively by all contributing graphic elements.

For example, overprint graphic element 401 is associated with an overprint region stack containing value 207-206. Graphic element 207 is defined with a Device3 source color space comprising colorants magenta, yellow and black. Graphic element 206 is defined with a DeviceCMYK source color space comprising non-zero colorants cyan. The combined Device4 source color space is chosen with colorant cyan contributed by graphic element 206 and colorants magenta, yellow and black contributed by graphic element 207.

If a contributing graphic element's source color space is incongruous with color spaces of other contributing graphic elements, it may be appropriate to transform the graphic element's color to one that is congruous. An additional set of rules and combining methods can be defined to determine how to combine incongruous colorants in an overprint region. One possible rule set is described in Table 1. The goal of these rule sets may be, for example, to maintain or increase color fidelity and consistency with the artist's intent while maintaining or reducing the level of complexity. Note that wide gamut color spaces can include, for example: DeviceRGB, CalRGB, DeviceGray, CalGray, Lab, and ICCBased. Examples of narrow gamut color spaces include DeviceCMYK, Separation and DeviceN. A subtractive color space defines at least one subtractive colorant. A subtractive colorant may comprise a process colorant or a spot colorant.

TABLE 1

| Rule # | Condition For Use | Color Combining Method |
|---|---|---|
| 1 | At least one contributing graphic element paints a subtractive source process colorant and no graphic element paints last defining a wide gamut color space. | The overprint graphic element defines a DeviceN source color space. Transform a graphic element's color defined by an incongruous color space to subtractive source process colorants. Preserve a graphic element's color defined by a congruous source color space. Combine color from all graphic elements using acongruous color combining method. |
| 2 | A graphic element paints last space. | No earlier defining a wide gamut color painting graphic element contributes color as the wide gamut color of the one that paints last is assumed to paint in all process colorants. |
| 3 | No contributing graphic element paints a subtractive source process colorant. At least one graphic element defines a wide gamut color space, and at least one graphic element paints a spot colorant. | The overprint graphic element defines a DeviceN target color space. Transform a wide gamut graphic element color to subtractive process colorants. Transform a graphic element spot colorant, not painted by target device, to subtractive process colorants using a recipe. Preserve a graphic element's spot colorant if it is painted by target device. Combine subtractive target process colorants from all graphic elements using combining algorithm (see below). Combine spot colorants using acongruous color combining method. |

As an example of the Rule #1, refer to FIGS. 3 and 5, where overprint graphic element 406 is associated with an overprint region stack containing value 204-203. Graphic element 204 is defined with a Device3 source color space defining cyan, green and red colorants. Graphic element 203 is defined with a Lab color space (independent of a source device). Assuming a DeviceCMYK source color space, graphic element 204 paints some colorants of DeviceCMYK. Therefore, graphic element 203 color is transformed to DeviceCMYK source color space. Since graphic element 204 already contributes cyan, the rule set can determine that graphic element 203 only contributes magenta, yellow and black. Therefore, overprint graphic element 406 is defined by a Device6 color space that defines cyan, green and red (contributed by 203) and magenta, yellow and black (contributed by 204).

As an example of the Rule #2, consider reversing the painting-order of graphic elements 203 and 204 with graphic element 204 not painting a red spot colorant. In that case, graphic element 203 would be unchanged and graphic element 204 would not contribute color because its process colorants are assumed painted by the wide gamut color of graphic element 203.

As an example of the Rule #3, referring to FIGS. 3 and 5, overprint graphic element 404 is associated with an overprint region stack containing value 209-203. Graphic element 209 is defined with a Separation source color space defining a pink colorant. Graphic element 203 is defined with a Lab color space. Assuming a DeviceCMYK source color space, graphic element 209 does not paint any of the source colorants. Therefore, the Lab color for graphic element 203 is transformed to the target color space. Recall that the example target color space is a DeviceN color space including hexachrome process colorants (cyan, magenta, yellow, black, orange and green). Assuming the target device defines a Device7 (or higher) color space that defines hexachrome process colorants and a pink spot colorant, the overprint graphic element's color space is defined as a Device7 color space with hexachrome process colorants (contributed by 203) and pink spot colorant (contributed by 209). The overprint graphic element is marked to indicate to color matcher 122 that color matching has already been performed.

As another example of Rule #3, as depicted in FIG. 5, assuming the target device does not paint the pink spot colorant, graphic element 209 pink spot colorant is transformed to hexachrome process colorants. The target process colorants of the two graphic elements can then be combined using a combining algorithm. A variety of algorithms can be devised for combining colorants that have already been transformed into a common color space. A combining algorithm, according to one embodiment of the invention, uses the following formula:

$$\text{Value}_{Combined} = 1 - (1 - \text{Value}_1) * (1 - \text{Value}_2) * \ldots (1 - \text{Value}_N)$$

where Value is a value, ranging from zero to one, for one colorant and N is the number of graphic elements contributing that colorant.

Variations on these rules are also possible. As an example, if the foreground (topmost) graphic element paints at least one source process colorant and the background graphic elements paint no source process colorants and at least one spot colorant, the following method (filtering the background through source color space) can be applied. This may result in less gamut compression of background color contributions than the first rule.

The filtering method begins by transforming the color of each background graphic element that paints in a wide gamut color space to source device color space. Next, set those source process colorant values that would contribute (e.g. are not painted by the foreground element) to zero. Transform the remaining (non-contributing) color to target color space. Also, transform the complete background source process color to target color space. Use an algorithm to remove the non-contributing color from the complete color in target color space. This results in background graphic element target colorant values that have been filtered through source color space. Next, transform the foreground graphic element's source color to target color space and use a combining algorithm to combine target space colorant values from each graphic element.

A filtering algorithm, according to one embodiment of the invention, uses the following formula, which is the inverse of the combining algorithm:

$$\text{Value}_{Filtered} = (\text{Value}_{Complete} - \text{Value}_{Non-Contributing}) / (1 - \text{Value}_{Non-Contributing})$$

where Value is a value, ranging from zero to one, for one colorant. A variety of filtering algorithms can be devised including those that are the inverse of a variety of combining algorithms.

Given the aforementioned set of methods for combining colors, the next detail is to use these methods in the context of an overprint graphic element type, chosen to represent the contributing graphic elements.

Overprint Graphic Element Type

A set of goals govern the choice of overprint graphic element type given a combination of contributing graphic element types. The goals include maintaining or increasing accuracy and maintaining or reducing complexity. For any combination of contributing graphic elements, the choice of elements can be simplified to comparing two graphic elements to determine the best representation then iterating over all remaining contributors. FIG. 7 illustrates exemplary overprint graphic element types for pairs of contributing graphic element types. Graphic elements to compare are identified by column 702 and row 704. The intersection of a column and row identifies the preferred graphic element type to represent their overprint region. Various combinations are discussed below. Overlap order is not significant.

A path type overlapping another path type may be best represented by a (filled) path type. The overprint is painted using either path clipped by the outline of the other path. The overprint fill color is determined based on the fill or stroke colors of the contributing paths. This representation provides accuracy and complexity consistent with the contributing graphic elements.

A path type overlapping a shading type may be best represented by a shading type. The shading is painted using the path to clip. The shading color is determined based on constant fill or stroke colors of the path and position dependent color of the shading. Contributing colorants that were position dependent remain position dependent. This representation provides accuracy and complexity consistent with the contributing graphic elements.

A path type overlapping a blend pseudo-type may be best represented by a blend type. Each of the blend's filled paths is painted using the path to clip. Each path color is determined as described above for overlapping paths. This provides accuracy and complexity consistent with the contributing graphic elements. An alternative representation could be a shading, if the function and geometry information that the blend is approximating can be determined. This would provide increased color accuracy and reduced complexity. However, it may not be possible to determine this information.

A blend pseudo-type type overlapping a blend pseudo-type may similarly be best represented by a blend pseudo-type. Each of either blend's filled paths are painted using each of the other blend's paths to clip. The overprint blend comprises a new collection of filled paths, each of which have color determined as described above for overlapping paths. Some filled paths from one blend may not overlap filled paths from the other blend. Clipping ensures that nothing paints in these areas. This representation provides accuracy and complexity consistent with the contributing graphic elements. If the number of elements (N) in each blend is large then the complexity ($N^2$) can be too large. In this case, the preferred representation is an image. In the latter case, each blend is rendered to a set of coincident pixels and their colorants combined pixel-wise. The number of pixels chosen to represent the combination is based on balancing accuracy and complexity. Rules for balancing these objectives can be pre-determined.

A text type overlapping a path type may be best represented by a text type. The text is painted using the path to clip. The text color is determined based on constant fill or stroke colors of the path and the text. Geometrical accuracy is maintained by painting with the text type. Color accuracy and complexity are consistent with the contributing graphic elements.

A text type overlapping a text type may also be best represented by a text type. Either text can be chosen to paint using the other to clip. The text color is determined based on constant fill or stroke colors of both text graphic elements. With this representation, color accuracy and complexity are consistent with the contributing graphic elements. If a clipping text graphic element is only filled, the text is used to clip with no reduction of geometrical accuracy. If a clipping text graphic element is only stroked, the approximate outline of the stroked area is used to clip with some reduction of geometrical accuracy. Similarly, if a text is stroked and filled, the approximate outline of the combined fill and stroke areas is used to clip. If one text is only filled and the other is stroked, the stroked text is painted using the filled text to clip. In other cases, reducing geometrical accuracy may be preferred to reducing color accuracy or increasing complexity by using an image representation, for example.

Figure 8A:
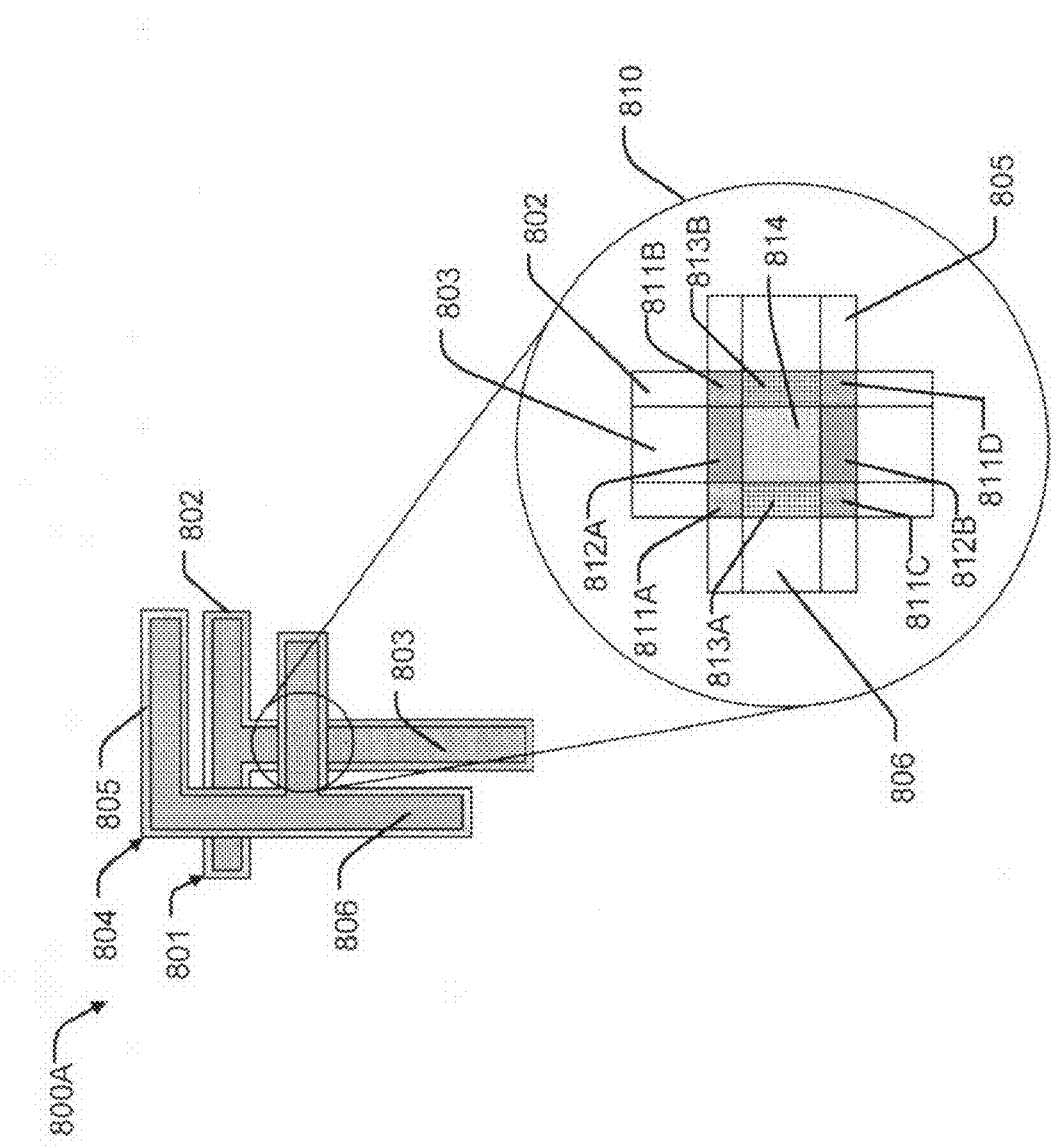
FIG. 8A is a diagram illustrating an example of text overprinting text.

FIG. 8A depicts an example of text overprinting text. Both text graphic elements 801 and 804 have stroke and fill colors defined that are different. Graphic element analysis engine 112 breaks these graphic elements into fill-only and stroke-only text elements (802-803 and 805-806) to simplify the method. One part of the overlap of these four text graphic elements is shown in enlargement 810, with overprint regions 811-814 depicted. Overprint text graphic element 811, comprising closed path sections 811A-811D, represents the overlap of graphic element 802 clipped by graphic element 805. Overprint text graphic element 812, comprising closed path sections 812A-812B, represents the overlap of graphic element 805 clipped by graphic element 803. Overprint text graphic element 813, comprising closed path sections 813A-813B, represents the overlap of graphic element 802 clipped by graphic element 806. Overprint text graphic element 814 represents the overlap of graphic element 803 clipped by graphic element 806. The color of each overprint graphic element may be distinct, as shown, depending on the colorants contributed by each of the four colors defined for text 802, 803, 805 and 806.

A text type overlapping a blend pseudo-type may be best represented by a blend pseudo-type, similar to the path-blend case. Each of the blend's filled paths is painted using the text to clip. This provides color accuracy and complexity consistent with the contributing graphic elements. Geometrical accuracy is dependent on the use of the text geometry information or approximate outline for clipping.

Figure 8B:
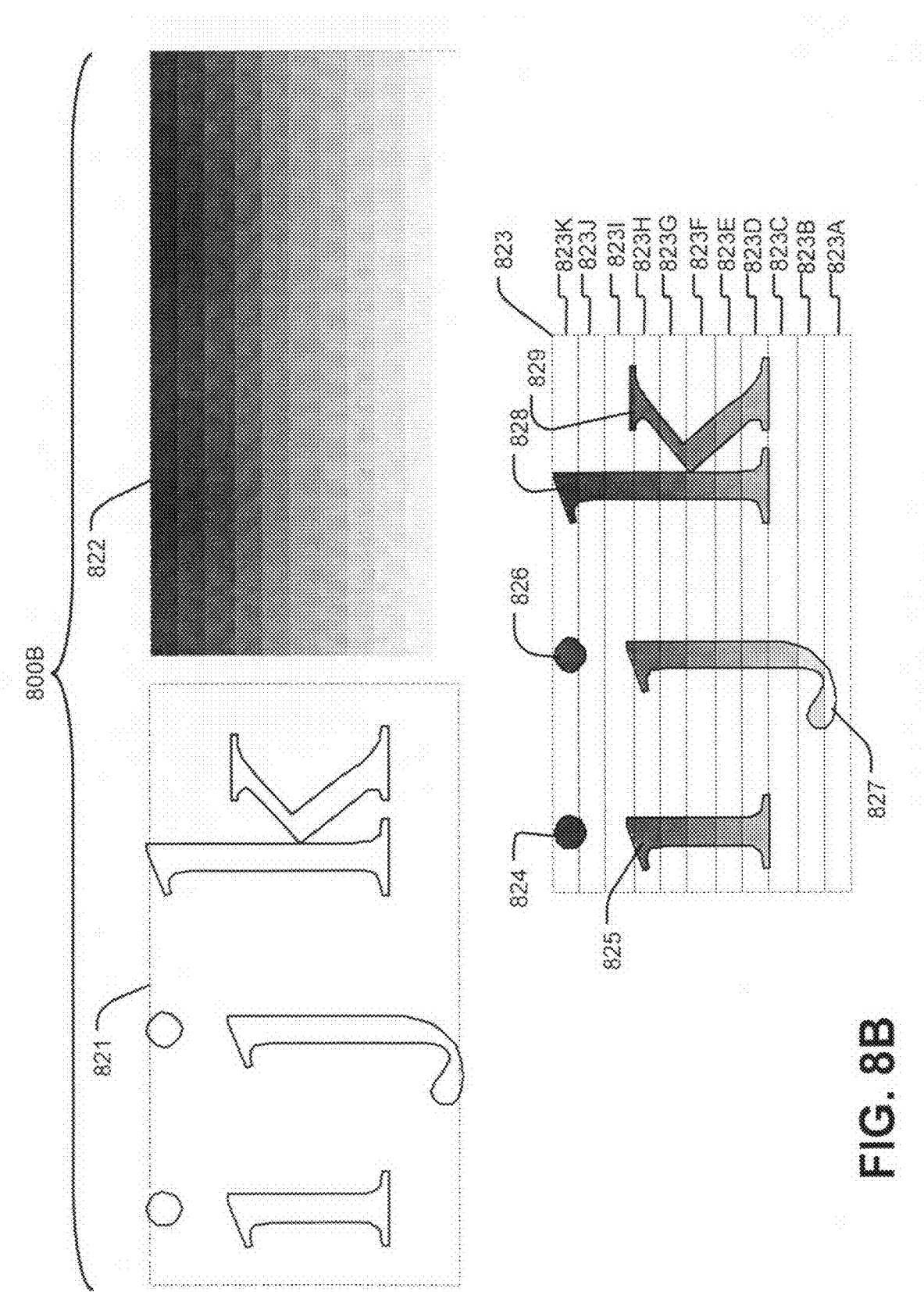
FIG. 8B is a diagram illustrating an example of text overprinting a shading.

FIG. 8B depicts an example of text overprinting a blend. Graphic element 821 (bounding box shown with dashed line) is a text graphic element with a 50% cyan fill color and no stroke. Graphic element 822 is a blend graphic element comprising ten filled paths arranged vertically. The painted colorant for each filled path is black, with a constant colorant value within each fill. The colorant values vary between fills by 10%, from 0% at the bottom to 100% at the top. Although graphic elements 821 and 822 are shown separately for clarity, they overlap such that their bounding boxes are aligned. Graphic element 823 depicts the overprint graphic element that results. It is a blend graphic element comprising a series of horizontal filled paths (823A-823K bounding boxes shown with dashed lines) similar to those in blend 822. Each filled path's color is constant, with 823A having a color of 50% cyan and 0% black and 823K having a color of 50% cyan and 100% black. Each filled path is clipped by the closed path sections 824-829 derived from text graphic element 821 so that only the areas outlined by the text paint color.

A text type overlapping a shading type may be best represented by a shading type. The shading is painted using the text to clip. The shading color is determined based on constant fill or stroke colors of the text and position dependent color of the shading. Contributing colorants that were position dependent remain position dependent. This provides color accuracy and complexity consistent with the contributing graphic elements. Geometrical accuracy is dependent on the use of the text geometry information or approximate outline for clipping.

A shading type overlapping a blend pseudo-type may be best represented by a collection of shadings. Each of the blend's filled paths is converted to a shading type and is clipped by the original shading graphic element. Each shading's color is determined based on a corresponding path's constant fill and the position dependent color of the original shading graphic element. For each new shading graphic element in the collection, a new shading definition, based on the original shading graphic element and the geometry of the new shading element is determined. This provides accuracy and complexity consistent with the contributing graphic elements. Reduced complexity may be possible by choosing an image representation.

A shading type overlapping a shading type may be best represented by an image type or a shading type. Choosing a shading is preferred for color accuracy if combining the functions governing the position dependent color is not too complex. Otherwise, if a shading representation is too complex, the preferred representation is an image.

Figure 8C:
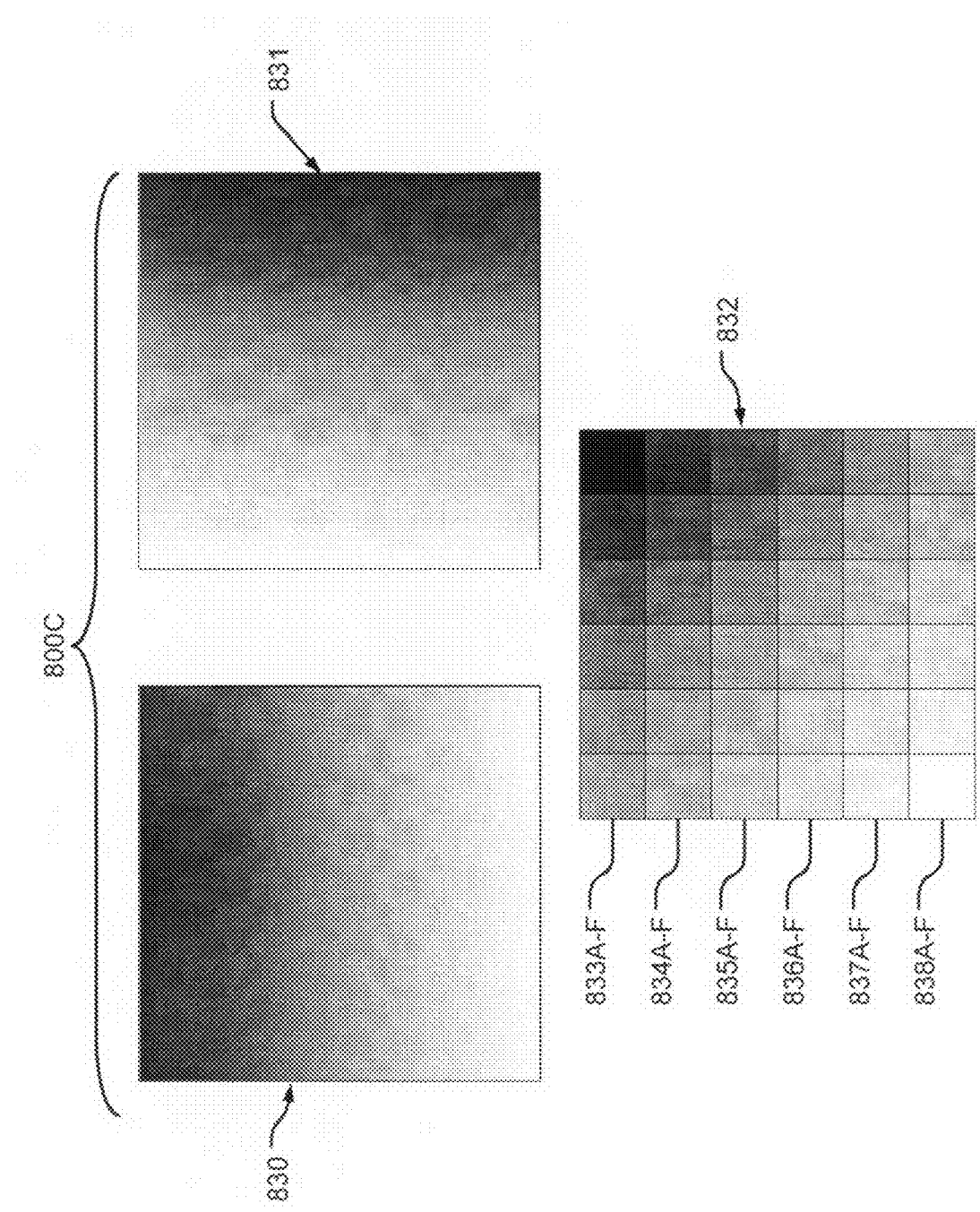
FIG. 8C is a diagram illustrating an example of a shading overprinting a shading.

FIG. 8C depicts an example of an image representation chosen to represent a shading overprinting a shading. Although graphic elements 830 and 831 are shown separately for clarity, they overlap such that their bounding boxes are aligned. Shading graphic element 830 paints a black colorant whose value varies from 0% at the bottom to 50% at the top. Shading graphic element 831 cyan colorant whose value varies from 0% at the left to 100% at the right. Image graphic element 832 represents the overprint region with 833A-F comprising the first row of pixels and 838A-F comprising the last row of pixels. The color of pixel 833A is 50% black and 0% cyan. The colorant value of pixel 833F is 50% black and 100% cyan. The colorant value of pixel 838A is 0% black and 0% cyan. The colorant value of pixel 838F is 0% black and 100% cyan. The remaining pixels have cyan and black colorant value corresponding to the shape of the shading functions.

An image type overlapping any of the other types may be best represented by an image type. The image's pixels are painted using the other type to clip. The combined color is determined at each pixel location based on the colorant values from the image pixel color and the other graphic element color (constant, position dependent or coincident pixel color). This provides accuracy and complexity that is consistent with at least the image contributing element. This representation can be an alternate representation for an arbitrary combination of element types as it is can represent the geometry of any overlap region, especially when imaged on a raster device, with geometrical accuracy determined by the number of pixels chosen to represent the image. Its color accuracy may also be limited. However, if complexity becomes the dominant factor an image may be the preferred representation.

Figure 8D:
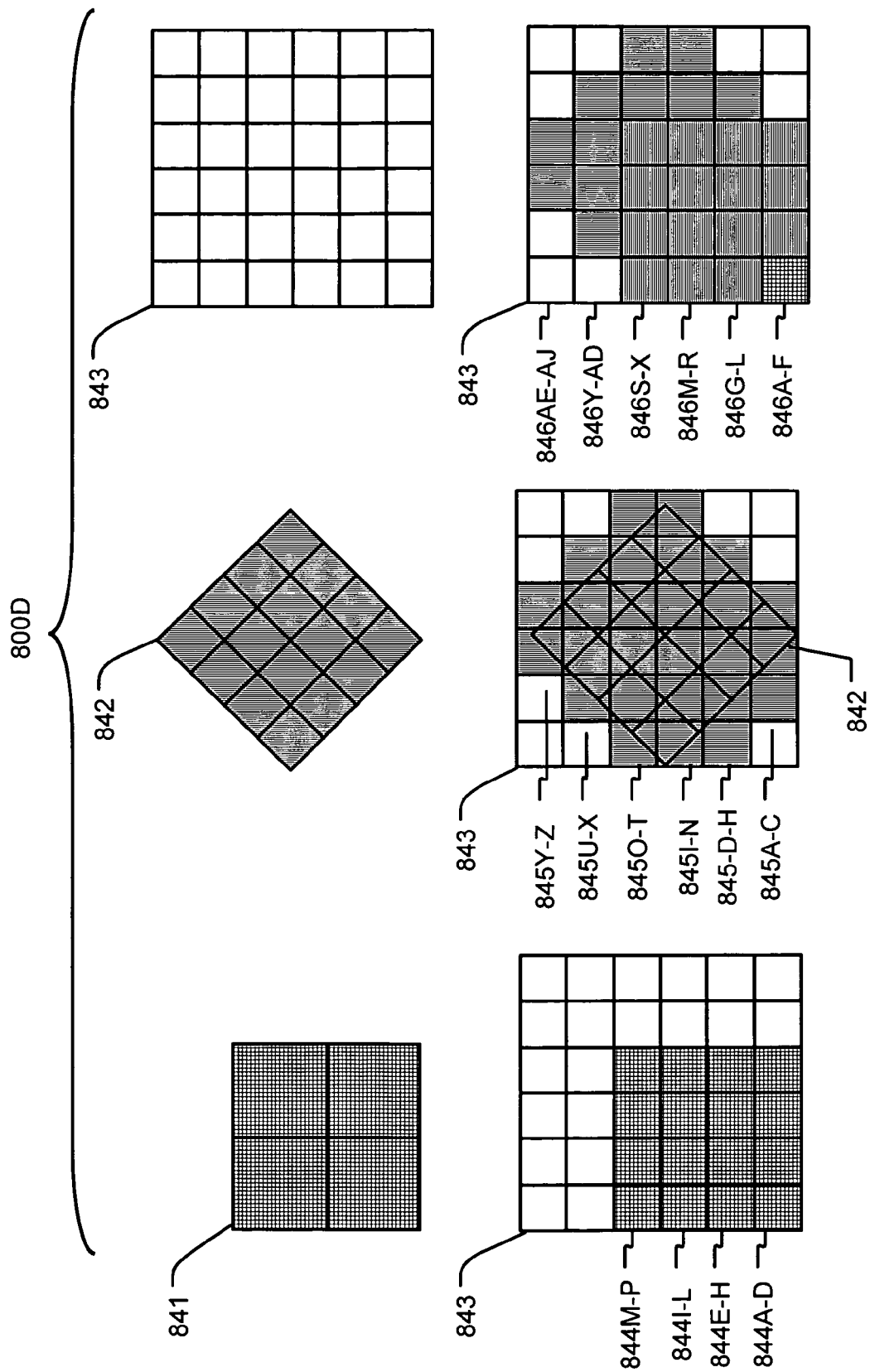
FIG. 8D is a diagram illustrating an example of an image overprinting an image.

FIG. 8D depicts an example of an image overprinting an image. An image graphic element is depicted as having four pixels 841, arranged in a coordinate system aligned with the page. Another image graphic element (bounding box shown with dashed lines) is depicted as having 16 pixels 842, arranged in a coordinate system rotated at 45 degrees relative to the page. Although the two images are shown separately for clarity, they are overprinted with the left and bottom sides of their bounding boxes aligned.

Pixel grid 843 is determined for combining the pixels 841 and 842. A variety of methods can be used for determining pixel grid 843. As an example, the number of pixels in each dimension can be the maximum (or some multiple) of the number of pixels in the same dimension of each contributing graphic element. The coordinate system of one contributing graphic element can be used as the coordinate system of the image pixel grid or another coordinate system can be determined. Regardless, the pixels from each contributing image graphic element must be mapped to align with the overprint image pixel grid.

Pixels 844 (shown shaded) result from mapping image 841 onto pixel image grid 843. Similarly, pixels 845 (shown shaded) result from mapping image 842 onto pixel image grid 843. The value of a mapped pixel could be determined based on more than one original pixel. As an example, pixel 845U overlaps with two pixels 842, whereas pixel 845N only overlaps with one of pixels 842. One method for determining a pixel's color, when mapping, is to choose the color of the closest original pixel. As one alternative, an interpolation of neighboring pixel colors can be used.

Overprint image pixels 846 are also depicted. Pixel 846A color is contributed only by pixel 844A. Pixel 846B color is contributed by coincident pixels 844B and 845A. Pixel 846E has no color since neither pixel 844 nor 845 contribute color at that pixel location. Pixel 846K color is contributed only by coincident pixel 845H. Similarly shaded (or un-shaded) pixels have their color contributed similar to the example pixels described above.

Masked image and image mask types are not illustrated in FIG. 7. A preferred approach taken for representing graphic elements involving these two types is similar. The approach, although achieving the same outcome as painting with one contributing graphic element and clipping with the others, is achieved in a less complex fashion. Given an overlap between two or more graphic elements comprising masks, a hierarchy of graphic elements is chosen to represent the overprint region. The number of graphic elements in the hierarchy is determined by the number of contributing graphic elements comprising masks.

The color painted by an overprint graphic element hierarchy is determined as described above and may be constant color, position dependent color or pixel-wise color. When determining a hierarchy's overprint color, image masks are treated as filled paths and masked images are treated as images. Thus, for example, an overprint region including at least one masked image can produce a pixel-wise color while an overprint region including image masks and a shading can produce a position dependent color.

An overprint graphic element hierarchy dictates the areas where the overprint color will paint (e.g. a clipping region). By traversing the hierarchy and applying the corresponding mask at each step, a pattern of enabled pixels, coinciding with enabled pixels from each mask, is iteratively constructed. For overprint regions with multiple masked graphic elements, this approach is comparatively simple.

In some PDLs, a pattern is defined as a language content stream that defines one or more graphic elements. Typically, a pattern can be specified for a graphic element's stroke or fill color space, instead of a normal color space with colorant values, so that the stroke or fill areas are painted with the pattern rather than a constant color. When the painted area is larger than the pattern's dimension, the pattern is tiled according to a tiling vector that determines the spacing between instances of the pattern tile. The pattern construct provides a mechanism for linking elements in a hierarchy.

The top elements of an overprint graphic element hierarchy are image masks. The bottom element is either an image mask, corresponding to constant or position dependent overprint color. Alternatively, the bottom element is a masked image, corresponding to pixel-dependent color. Each element in the hierarchy has a mask corresponding to one of the overprinting masked graphic elements. The top elements define a fill color space that is a pattern corresponding to the pattern of the graphic element below it in the hierarchy. The bottom element in hierarchy defines the overprint color for the overprint region.

Figure 8E:
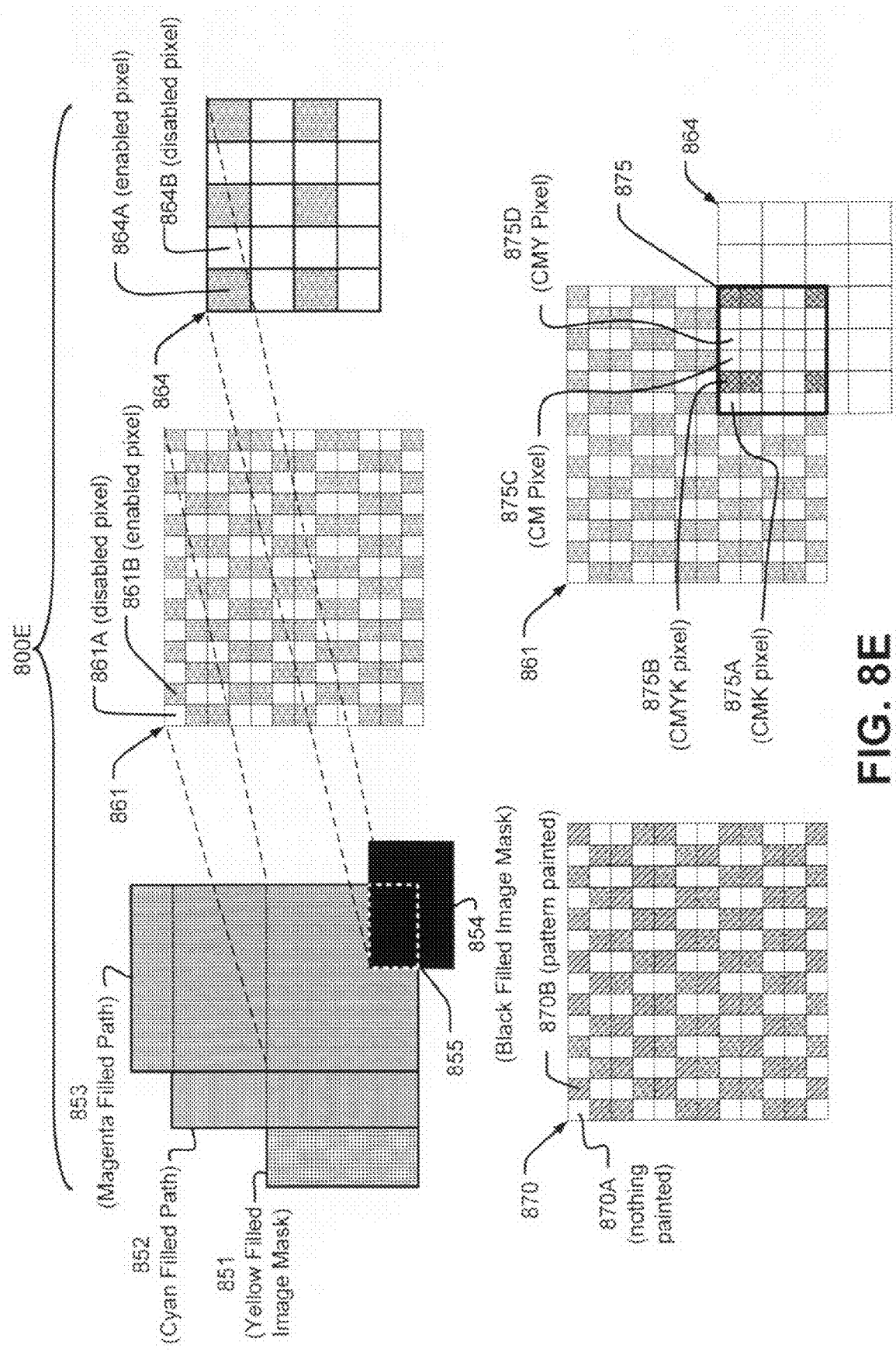
FIG. 8E is a diagram illustrating multiple masked graphic elements overprinting.

FIG. 8E illustrates an example of this. Image mask 851, defining a yellow fill, is overprinted by filled path 852, defining a cyan fill. Both of those are overprinted by filled path 853, defining a magenta fill. Finally, image mask 854, defining a black fill, overprints all three. The overprint region 855 of interest is the one corresponding to the overlap of all four graphic elements. Image mask pixels 861, corresponding to image mask 851, are depicted separately. Colored pixels, exemplified by image mask pixel 861B, enable painting. White pixels, exemplified by image mask pixel 861A, disable painting. Similarly, image mask pixels 864, corresponding to image mask 854, are depicted separately.

Processing mask 851 causes the generation of the top image mask graphic element in the overprint graphic element hierarchy. This top graphic element includes a mask having image mask pixels 861. The element also includes a fill color space that defines a pattern describing the next graphic element in the hierarchy. Pixels 870 depict the appearance of the top image mask graphic element. Colored pixels, exemplified by pixel 870B, enable painting of the pattern. White pixels, exemplified by pixel 870A, disable painting of the pattern.

The next graphic element in the hierarchy is an image mask and it is the bottom element in the hierarchy since there are only two elements with masks in the overprint region. This image mask element includes a mask having image mask pixels 864. The element also includes a fill color space that defines a DeviceCMYK color space. The element also includes a fill color comprising colorant values for each of the CMYK colorants. The color is constant, since each of the contributing graphic elements define constant color. In particular, since each contributing graphic element paints in a different colorant, the colorant values of the image mask correspond to the union of the colorant values from each of the contributing graphic elements.

Pixels 875, corresponding to overprint region 855, are depicted. Image mask pixels 861 and 864 are also depicted to illustrate the pattern painting effect. Colored pixels, exemplified by pixel 875B, paint the constant color defined by the bottom graphic element which includes CMYK colorants. These pixels correspond to locations where pixels from both image mask 861 and 864 enable painting. White pixels, exemplified by pixels 875A, 875C and 875D do not paint any color for this overprint graphic element. However, color from earlier painting graphic elements shine through the disabled pixels.

In particular, at pixels exemplified by 875A, pixels with CMK colorants paint through. This corresponds to an earlier painting overprint graphic element formed by graphic elements 852-854 overprinting where image mask pixels 864 are enabled. Similarly, at pixels exemplified by 875D, pixels with CMY colorants paint through. This corresponds to an earlier painting overprint graphic element formed by graphic elements 851-853 overprinting where image mask pixels 861 are enabled. Finally, at pixels exemplified by 875C, pixels with CM colorants paint through. This corresponds to an earlier painting graphic element formed by graphic elements 852-853 overprinting.

Applications that process PDL may have difficulty supporting documents containing iterative masked pattern definitions. Thus, in another preferred embodiment, overprinted masks are combined pixel-wise into a high resolution mask having mask pixels enabled where each contributing mask is enabled and where mask pixels are disabled otherwise. A single image mask or masked image representation is chosen for the overprint region based on its contributed color. Its color is determined as described above.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method for color matching an overprinted graphic document for a target device, the method comprising:
    obtaining the overprinted graphic document comprising a plurality of graphic elements, each of the graphic elements comprising at least one color;
    examining the plurality of graphic elements to identify at least one overprint region, the overprint region corresponding to an area wherein a plurality of contributing graphic elements overlap, wherein each contributing graphic element contributes at least some color to the overprint region;
    selecting an overprint graphic element type from a plurality of graphic element types;
    creating at least one overprint graphic element of the overprint graphic element type that paints in the corresponding overprint region;
    establishing at least one color for the overprint graphic element;
    creating a modified document by adding the at least one overprint graphic element to the overprinted graphic document;
    wherein examining the plurality of graphic elements to identify the at least one overprint region comprises:
    determining a plurality of graphic element outlines corresponding to the plurality of graphic elements;
    determining a plurality of overlap regions each defined by an intersection of a plurality of overlapping graphic element outlines;
    associating a graphic element with an overlap region if the graphic element corresponds to one of the plurality of overlapping graphic element outlines defining the overlap region;
    determining if a graphic element associated with an overlap region contributes color to the overlap region;
    associating a graphic element that contributes color to an overlap region with an ordered overprint stack associated with the overlap region, wherein a graphic element that paints earlier is positioned in the stack below a graphic element that paints later; and,
    declaring an overlap region as an overprint region if the corresponding overprint stack comprises a plurality of contributing graphic elements.

2. A method according to claim 1 comprising producing a color-matched document by transforming at least one color in the modified document to a target color.

3. A method according to claim 1 wherein each of the at least one colors is defined in a corresponding color space by at least one colorant value corresponding to the at least one colorant.

4. A method according to claim 3 wherein the color space comprises one of DeviceRGB, CalRGB, DeviceGray, CalGray, Lab, ICCBased, DeviceCMYK, Separation, and DeviceN.

5. A method according to claim 4 wherein transforming at least one color comprises making a transformation based on transformation information comprising at least one ICC profile.

6. A method according to claim 1 comprising configuring the overprint graphic element to paint after the last one of the plurality of contributing graphic elements has painted.

7. A method according to claim 6 wherein the overprint graphic element obscures some part of the plurality of contributing graphic elements.

8. A method according to claim 1 wherein the plurality of graphic element types includes: Image, Image Mask, Masked Image, Shading, Text, and Path types.

9. A method according to claim 8 wherein the plurality of graphic element types also includes a pseudo-type wherein elements of the pseudo-type comprise a plurality of elements of a graphic element type.

10. A method for color matching an overprinted graphic document for a target device, the method comprising:
    obtaining an overprinted graphic document comprising a plurality of graphic elements, each of the graphic elements comprising at least one color;
    examining the plurality of graphic elements to identify at least one overprint region, the overprint region corresponding to an area wherein a plurality of contributing graphic elements overlap, wherein each contributing graphic element contributes at least some color to the overprint region;
    selecting an overprint graphic element type from a plurality of graphic element types;
    creating at least one overprint graphic element of the overprint graphic element type that paints in the corresponding overprint region;
    establishing at least one color for the overprint graphic element;
    creating a modified document by adding the at least one overprint graphic element to the overprinted graphic document;
    producing a color-matched document by transforming at least one color in the modified document to a target color; and
    wherein transforming at least one color in the modified document to a target color comprises, for a color, changing a color space of the color and at least one colorant value of the color based on transformation information associated with the color space of the color and a color space of the target color.

11. A method for color matching an overprinted graphic document for a target device, the method comprising:
    obtaining an overprinted graphic document comprising a plurality of graphic elements, each of the graphic elements comprising at least one color;
    examining the plurality of graphic elements to identify at least one overprint region, the overprint region corresponding to an area wherein a plurality of contributing graphic elements overlap, wherein each contributing graphic element contributes at least some color to the overprint region;

selecting an overprint graphic element type from a plurality of graphic element types;

creating at least one overprint graphic element of the overprint graphic element type that paints in the corresponding overprint region;

establishing at least one color for the overprint graphic element;

creating a modified document by adding the at least one overprint graphic element to the overprinted graphic document;

producing a color-matched document by transforming at least one color in the modified document to a target color; and wherein transforming at least one color in the modified document to a target color comprises, for a color, performing no transformation if the color is defined in a target color space.

12. A method for color matching an overprinted graphic document for a target device, the method comprising:

obtaining an overprinted graphic document comprising a plurality of graphic elements, each of the graphic elements comprising at least one color;

examining the plurality of graphic elements to identify at least one overprint region, the overprint region corresponding to an area wherein a plurality of contributing graphic elements overlap, wherein each contributing graphic element contributes at least some color to the overprint region;

selecting an overprint graphic element type from a plurality of graphic element types;

creating at least one overprint graphic element of the overprint graphic element type that paints in the corresponding overprint region;

establishing at least one color for the overprint graphic element;

creating a modified document by adding the at least one overprint graphic element to the overprinted graphic document;

wherein establishing at least one color for the overprint graphic element comprises, for an overprint color:

establishing an overprint color space based on a plurality of color contribution rules in conjunction with the plurality of contributing graphic elements; and establishing at least one overprint colorant value by combining a plurality of contributing colors from the plurality of contributing graphic elements based on a plurality of color contribution rules.

13. A method according to claim 12 wherein the plurality of color contribution rules includes:

congruous color contribution rules, applicable for determining a contribution of a plurality of contributing colors if the plurality of contributing colors define congruous colorants; and, incongruous color contribution rules, applicable for determining a contribution of a plurality of contributing colors if the plurality of contributing colors define incongruous colorants.

14. A method according to claim 13 comprising establishing an overprint color space wherein the plurality of contributing colors comprise congruous subtractive source colorants and the method comprises establishing a DeviceN source color space wherein colorants in the DeviceN source color space comprise colorants derived from the plurality of contributing colors.

15. A method according to claim 13 wherein establishing at least one overprint colorant value is based on opaque color combining rules when the plurality of contributing colors paint colorants using an opaque imaging model.

16. A method according to claim 13 wherein establishing at least one overprint colorant value is based on transparent color combining rules when a contributing color paints a colorant using a transparent imaging model.

17. A method according to claim 13 comprising establishing an overprint color space wherein at least one contributing color paints a subtractive source process colorant and a contributing color painting last is defined in a narrow-gamut color space and the method comprises establishing a DeviceN source color space defining a plurality of DeviceN colorants derived from the plurality of contributing colors.

18. A method according to claim 17 wherein establishing at least one overprint colorant value comprises, based on the incongruous color contribution rule:

obtaining a contributing color's at least one colorant value if the contributing color's color space is congruous with the DeviceN source color space;

transforming a contributing color's at least one colorant value to at least one source process colorant value if the contributing color's color space is incongruous with the DeviceN source color space; and combining the at least one colorant value corresponding to the plurality of contributing colors based on a plurality of congruous color contribution rules.

19. A method according to claim 13 wherein a contributing color painting last is defined in a wide-gamut color space and establishing at least one color for an overprint graphic element comprises, for each color, establishing an overprint color space by selecting a color space of the contributing color painting last; and, establishing at least one overprint colorant value by selecting one or more colorant values of the contributing color painting last.

20. A method according to claim 13 wherein:

no contributing color paints a subtractive source process colorant;

at least one background contributing color comprises a wide-gamut color space; and at least one contributing color paints at least one spot colorant, is satisfied, and the method comprises establishing a DeviceN target color space defining a plurality of DeviceN colorants painted by the target device.

21. A method according to claim 20 wherein establishing at least one overprint colorant value comprises, based on an incongruous color contribution rule:

transforming a contributing color's at least one colorant value to at least one target process colorant value, if the contributing color's color space is incongruous with the DeviceN target color space;

obtaining a contributing color's at least one spot colorant value if the target device paints the spot colorant;

converting a contributing color's at least one spot colorant value to at least one target process colorant value if the target device does not paint the spot colorant, the converting based on a spot colorant recipe;

combining the at least one target process colorant value from the plurality of contributing colors using a combining algorithm; and combining the at least one spot colorant value from the plurality of contributing colors based on a plurality of congruous color contribution rules.

22. A method according to claim 21 wherein the combining algorithm comprises an algorithm described by:

$$\text{Value}_{combined}=1-(1-\text{Value}_1)*(1-\text{Value}_2)* \ldots (1-\text{Value}_N)$$
wherein Value is a value, ranging from zero to one, for one colorant and N is the number of colors contributing that colorant.

23. A method according to claim 13 wherein a foreground contributing color paints at least one subtractive source process colorant, each background contributing color paints no subtractive source process colorants, and at least one background contributing color paints at least one spot colorant wherein the method comprises establishing a DeviceN target color space wherein colorants of the DeviceN target color space are defined by the target device.

24. A method according to claim 23 wherein establishing at least one overprint colorant value comprises, based on an incongruous color contribution rule:

identifying a DeviceN source color space defining a plurality of DeviceN colorants derived from the plurality of contributing colors;

filtering each background contributing color through the DeviceN source color space to produce at least one background target process colorant value;

transforming a foreground color's at least one colorant value to at least one foreground target process colorant value corresponding to the DeviceN target color space; and combining the at least one foreground and the at least one background target process colorant value and using a combining algorithm.

25. A method according to claim 24 wherein the combining algorithm comprises an algorithm described by:

$$\text{Value}_{combined}=1-(1-\text{Value}_1)*(1-\text{Value}_2)* \ldots (1-\text{Value}_N)$$
wherein Value is a value, ranging from zero to one, for one colorant and N is the number of colors contributing that colorant.

26. A method according to claim 24 wherein filtering each background contributing color through the DeviceN source color space comprises:

transforming the background contributing color's at least one colorant value to at least one source process colorant value corresponding to the DeviceN source color space;

transforming a copy of the at least one source process colorant value to at least one target process colorant value corresponding to the DeviceN target color space;

partitioning the at least one source process colorant value into zero or more contributing source process colorant values and zero or more non-contributing source process colorant values based on a plurality of color contribution rules and the foreground contributing color;

transforming the zero or more non-contributing source process colorant values to at least one non-contributing target process colorant values corresponding to the DeviceN target color space; and producing at least one background target process colorant value by filtering the zero or more non-contributing target process colorant values from the at least one target process colorant value using a filtering algorithm.

27. A method according to claim 26 wherein the filtering algorithm comprises an algorithm described by:

$$\text{Value}_{Filtered}=(\text{Value}_{complete}-\text{Value}_{Noncontributing})/(1-\text{Value}_{Non-Contributing})$$
wherein Value is a value, ranging from zero to one, for one colorant and N is the number of colors contributing that colorant.

* * * * *